United States Patent
Hazani et al.

(10) Patent No.: US 9,785,175 B2
(45) Date of Patent: Oct. 10, 2017

(54) COMBINING POWER FROM ELECTRICALLY ISOLATED POWER PATHS FOR POWERING REMOTE UNITS IN A DISTRIBUTED ANTENNA SYSTEM(S) (DASS)

(71) Applicant: Corning Optical Communications Wireless Ltd, Airport City (IL)

(72) Inventors: Ami Hazani, Ra'anana (IL); Shlomo Zilberman, Shoham (IL)

(73) Assignee: Corning Optical Communications Wireless, Ltd., Airport City (IL)

( * ) Notice: Subject to any disclaimer, the term of this patent is extended or adjusted under 35 U.S.C. 154(b) by 0 days.

(21) Appl. No.: 14/961,098

(22) Filed: Dec. 7, 2015

(65) Prior Publication Data

US 2016/0282894 A1    Sep. 29, 2016

Related U.S. Application Data

(60) Provisional application No. 62/139,137, filed on Mar. 27, 2015.

(51) Int. Cl.
*G06F 3/08* (2006.01)
*G05F 3/08* (2006.01)
(Continued)

(52) U.S. Cl.
CPC ............. *G05F 3/08* (2013.01); *H04L 12/10* (2013.01); *H04W 72/044* (2013.01); *H04W 88/085* (2013.01); *H04L 12/40045* (2013.01)

(58) Field of Classification Search
CPC combination set(s) only.
See application file for complete search history.

(56) References Cited

U.S. PATENT DOCUMENTS 4,449,246 A    5/1984    Seiler et al.
4,665,560 A    5/1987    Lange
(Continued)

FOREIGN PATENT DOCUMENTS

CN    1764123 A    4/2006
CN    101030162 A    9/2007
(Continued)

OTHER PUBLICATIONS

International Search Report for PCT/US2010/056458 mailed Aug. 2, 2011, 4 pages.
(Continued)

*Primary Examiner* — Mohamed Kamara
(74) *Attorney, Agent, or Firm* — C. Keith Montgomery

(57) ABSTRACT

Embodiments disclosed herein include combining power from isolated power paths for powering remote units in distributed antenna systems (DASs). In one example, a remote unit(s) is configured to include multiple input power ports for receiving power from multiple power paths. The received power from each input power port is combined to provide a combined output power for powering the remote unit. Thus, a remote unit can be powered by the combined output power. To avoid differences in received power on the multiple input power ports causing a power supply to supply higher power than designed or regulated, the input power ports in the remote unit are electrically isolated from each other. Further, the received power on the multiple power inputs ports can be controlled to be proportionally provided to the combined output power according to the maximum power supplying capabilities of the respective power supplies.

24 Claims, 11 Drawing Sheets

(51) Int. Cl.
*H04W 72/04* (2009.01)
*H04L 12/10* (2006.01)
*H04W 88/08* (2009.01)
*H04L 12/40* (2006.01)

(56) References Cited

U.S. PATENT DOCUMENTS

| | | |
|---|---|---|
| 4,939,852 A | 7/1990 | Brenner |
| 4,972,346 A | 11/1990 | Kawano et al. |
| 5,056,109 A | 10/1991 | Gilhousen et al. |
| 5,138,679 A | 8/1992 | Edwards et al. |
| 5,187,803 A | 2/1993 | Sohner et al. |
| 5,206,655 A | 4/1993 | Caille et al. |
| 5,208,812 A | 5/1993 | Dudek et al. |
| 5,278,989 A | 1/1994 | Burke et al. |
| 5,280,472 A | 1/1994 | Gilhousen et al. |
| 5,329,604 A | 7/1994 | Baldwin et al. |
| 5,381,459 A | 1/1995 | Lappington |
| 5,396,224 A | 3/1995 | Dukes et al. |
| 5,420,863 A | 5/1995 | Taketsugu et al. |
| 5,432,838 A | 7/1995 | Purchase et al. |
| 5,436,827 A | 7/1995 | Gunn et al. |
| 5,519,830 A | 5/1996 | Opoczynski |
| 5,534,854 A | 7/1996 | Bradbury et al. |
| 5,559,831 A | 9/1996 | Keith |
| 5,598,314 A | 1/1997 | Hall |
| 5,606,725 A | 2/1997 | Hart |
| 5,668,562 A | 9/1997 | Cutrer et al. |
| 5,682,256 A | 10/1997 | Motley et al. |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,802,173 A | 9/1998 | Hamilton-Piercy et al. |
| 5,809,395 A | 9/1998 | Hamilton-Piercy et al. |
| 5,809,431 A | 9/1998 | Bustamante et al. |
| 5,818,883 A | 10/1998 | Smith et al. |
| 5,839,052 A | 11/1998 | Dean et al. |
| 5,862,460 A | 1/1999 | Rich |
| 5,867,763 A | 2/1999 | Dean et al. |
| 5,889,469 A | 3/1999 | Mykytiuk et al. |
| 5,953,670 A | 9/1999 | Newson |
| 5,969,837 A | 10/1999 | Farber et al. |
| 5,983,070 A | 11/1999 | Georges et al. |
| 6,006,069 A | 12/1999 | Langston |
| 6,011,980 A | 1/2000 | Nagano et al. |
| 6,014,546 A | 1/2000 | Georges et al. |
| 6,037,898 A | 3/2000 | Parish et al. |
| 6,060,879 A | 5/2000 | Mussenden |
| 6,069,721 A | 5/2000 | Oh et al. |
| 6,118,767 A | 9/2000 | Shen et al. |
| 6,122,529 A | 9/2000 | Sabat, Jr. et al. |
| 6,125,048 A | 9/2000 | Loughran et al. |
| 6,128,477 A | 10/2000 | Freed |
| 6,157,810 A | 12/2000 | Georges et al. |
| 6,163,266 A | 12/2000 | Fasullo et al. |
| 6,188,876 B1 | 2/2001 | Kim |
| 6,192,216 B1 | 2/2001 | Sabat, Jr. et al. |
| 6,194,968 B1 | 2/2001 | Winslow |
| 6,212,274 B1 | 4/2001 | Ninh |
| 6,212,397 B1 | 4/2001 | Langston et al. |
| 6,222,503 B1 | 4/2001 | Gietema |
| 6,223,201 B1 | 4/2001 | Reznak |
| 6,236,863 B1 | 5/2001 | Waldroup et al. |
| 6,275,990 B1 | 8/2001 | Dapper et al. |
| 6,279,158 B1 | 8/2001 | Geile et al. |
| 6,295,451 B1 | 9/2001 | Mimura |
| 6,307,869 B1 | 10/2001 | Pawelski |
| 6,317,599 B1 | 11/2001 | Rappaport et al. |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,340,932 B1 | 1/2002 | Rodgers et al. |
| 6,353,600 B1 | 3/2002 | Schwartz et al. |
| 6,366,774 B1 | 4/2002 | Ketonen et al. |
| 6,370,203 B1 | 4/2002 | Boesch et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,405,018 B1 | 6/2002 | Reudink et al. |
| 6,415,132 B1 | 7/2002 | Sabat, Jr. |
| 6,421,327 B1 | 7/2002 | Lundby |
| 6,448,558 B1 | 9/2002 | Greene |
| 6,452,915 B1 | 9/2002 | Jorgensen |
| 6,480,702 B1 | 11/2002 | Sabat, Jr. |
| 6,496,290 B1 | 12/2002 | Lee |
| 6,519,449 B1 | 2/2003 | Zhang et al. |
| 6,535,330 B1 | 3/2003 | Lelic et al. |
| 6,535,720 B1 | 3/2003 | Kintis et al. |
| 6,551,065 B2 | 4/2003 | Lee |
| 6,580,402 B2 | 6/2003 | Navarro et al. |
| 6,580,905 B1 | 6/2003 | Naidu et al. |
| 6,587,514 B1 | 7/2003 | Wright et al. |
| 6,588,943 B1 | 7/2003 | Howard |
| 6,598,009 B2 | 7/2003 | Yang |
| 6,615,074 B2 | 9/2003 | Mickle et al. |
| 6,628,732 B1 | 9/2003 | Takaki |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,678,509 B2 | 1/2004 | Skarman et al. |
| 6,704,298 B1 | 3/2004 | Matsumiya et al. |
| 6,745,013 B1 | 6/2004 | Porter et al. |
| 6,763,226 B1 | 7/2004 | McZeal, Jr. |
| 6,785,558 B1 | 8/2004 | Stratford et al. |
| 6,801,767 B1 | 10/2004 | Schwartz et al. |
| 6,823,174 B1 | 11/2004 | Masenten et al. |
| 6,826,163 B2 | 11/2004 | Mani et al. |
| 6,836,660 B1 | 12/2004 | Wala |
| 6,836,673 B1 | 12/2004 | Trott |
| 6,842,433 B2 | 1/2005 | West et al. |
| 6,850,510 B2 | 2/2005 | Kubler |
| 6,876,056 B2 | 4/2005 | Tilmans et al. |
| 6,882,311 B2 | 4/2005 | Walker et al. |
| 6,885,344 B2 | 4/2005 | Mohamadi |
| 6,919,858 B2 | 7/2005 | Rofougaran |
| 6,931,659 B1 | 8/2005 | Kinemura |
| 6,934,511 B1 | 8/2005 | Lovinggood et al. |
| 6,934,541 B2 | 8/2005 | Miyatani |
| 6,941,112 B2 | 9/2005 | Hasegawa |
| 6,961,312 B2 | 11/2005 | Kubler et al. |
| 6,977,502 B1 | 12/2005 | Hertz |
| 6,984,073 B2 | 1/2006 | Cox |
| 7,015,826 B1 | 3/2006 | Chan et al. |
| 7,020,488 B1 | 3/2006 | Bleile et al. |
| 7,024,166 B2 | 4/2006 | Wallace |
| 7,039,399 B2 | 5/2006 | Fischer |
| 7,043,271 B1 | 5/2006 | Seto et al. |
| 7,050,017 B2 | 5/2006 | King et al. |
| 7,053,838 B2 | 5/2006 | Judd |
| 7,069,577 B2 | 6/2006 | Geile et al. |
| 7,072,586 B2 | 7/2006 | Aburakawa et al. |
| 7,073,953 B2 | 7/2006 | Roth et al. |
| 7,103,119 B2 | 9/2006 | Matsuoka et al. |
| 7,103,377 B2 | 9/2006 | Bauman et al. |
| 7,110,795 B2 | 9/2006 | Doi |
| 7,142,125 B2 | 11/2006 | Larson et al. |
| 7,142,535 B2 | 11/2006 | Kubler et al. |
| 7,142,619 B2 | 11/2006 | Sommer et al. |
| 7,144,255 B2 | 12/2006 | Seymour |
| 7,171,244 B2 | 1/2007 | Bauman |
| 7,177,728 B2 | 2/2007 | Gardner |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,269,311 B2 | 9/2007 | Kim et al. |
| 7,315,735 B2 | 1/2008 | Graham |
| 7,359,647 B1 | 4/2008 | Faria et al. |
| 7,359,674 B2 | 4/2008 | Markki et al. |

(56) References Cited

U.S. PATENT DOCUMENTS

| | | |
|---|---|---|
| 7,366,151 B2 | 4/2008 | Kubler et al. |
| 7,369,526 B2 | 5/2008 | Lechleider et al. |
| 7,388,892 B2 | 6/2008 | Nishiyama et al. |
| 7,392,025 B2 | 6/2008 | Rooyen et al. |
| 7,412,224 B2 | 8/2008 | Kotola et al. |
| 7,450,853 B2 | 11/2008 | Kim et al. |
| 7,451,365 B2 | 11/2008 | Wang et al. |
| 7,454,171 B2 | 11/2008 | Palin et al. |
| 7,460,507 B2 | 12/2008 | Kubler et al. |
| 7,469,105 B2 | 12/2008 | Wake et al. |
| 7,483,711 B2 | 1/2009 | Burchfiel |
| 7,486,782 B1 | 2/2009 | Roos |
| 7,505,747 B2 | 3/2009 | Solum |
| 7,512,419 B2 | 3/2009 | Solum |
| 7,515,526 B2 | 4/2009 | Elkayam et al. |
| 7,526,303 B2 | 4/2009 | Chary |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,551,641 B2 | 6/2009 | Pirzada et al. |
| 7,557,758 B2 | 7/2009 | Rofougaran |
| 7,567,579 B2 | 7/2009 | Korcharz et al. |
| 7,580,384 B2 | 8/2009 | Kubler et al. |
| 7,585,119 B2 | 9/2009 | Sasaki |
| 7,586,861 B2 | 9/2009 | Kubler et al. |
| 7,587,559 B2 | 9/2009 | Brittain et al. |
| 7,599,420 B2 | 10/2009 | Forenza et al. |
| 7,610,046 B2 | 10/2009 | Wala |
| 7,619,535 B2 | 11/2009 | Chen et al. |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,809,012 B2 | 10/2010 | Ruuska et al. |
| 7,812,766 B2 | 10/2010 | Leblanc et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,852,228 B2 | 12/2010 | Teng et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,970,428 B2 | 6/2011 | Lin et al. |
| 7,990,925 B2 | 8/2011 | Tinnakornsrisuphap et al. |
| 7,996,020 B1 | 8/2011 | Chhabra |
| 8,001,397 B2 | 8/2011 | Hansalia |
| 8,018,907 B2 | 9/2011 | Kubler et al. |
| 8,036,157 B2 | 10/2011 | Hanabusa et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,155,525 B2 | 4/2012 | Cox |
| 8,270,838 B2 | 9/2012 | Cox |
| 8,270,990 B2 | 9/2012 | Zhao |
| 8,306,563 B2 | 11/2012 | Zavadsky et al. |
| 8,328,145 B2 | 12/2012 | Smith |
| 8,406,941 B2 | 3/2013 | Smith |
| 8,417,979 B2 | 4/2013 | Maroney |
| 8,457,562 B2 | 6/2013 | Zavadsky et al. |
| 8,514,092 B2 | 8/2013 | Cao et al. |
| 8,532,492 B2 | 9/2013 | Palanisamy et al. |
| 8,548,330 B2 | 10/2013 | Berlin et al. |
| 8,588,614 B2 | 11/2013 | Larsen |
| 8,620,375 B2 | 12/2013 | Kim et al. |
| 8,622,632 B2 | 1/2014 | Isenhour et al. |
| 8,649,684 B2 | 2/2014 | Casterline et al. |
| 8,744,390 B2 | 6/2014 | Stratford |
| 8,830,035 B2 | 9/2014 | Lindley et al. |
| 8,831,428 B2 | 9/2014 | Kobyakov et al. |
| 8,831,593 B2 | 9/2014 | Melester et al. |
| 8,855,832 B2 | 10/2014 | Rees |
| 8,930,736 B2 | 1/2015 | James |
| 8,971,903 B2 | 3/2015 | Hossain et al. |
| 8,994,276 B2 | 3/2015 | Recker et al. |
| 9,026,036 B2 | 5/2015 | Saban et al. |
| 9,160,449 B2 | 10/2015 | Heidler et al. |
| 9,166,690 B2 | 10/2015 | Brower et al. |
| 9,223,336 B2 | 12/2015 | Petersen et al. |
| 9,343,797 B2 | 5/2016 | Shoemaker et al. |
| 2001/0036199 A1 | 11/2001 | Terry |
| 2002/0051434 A1 | 5/2002 | Ozluturk et al. |
| 2002/0097031 A1 | 7/2002 | Cook et al. |
| 2002/0123365 A1 | 9/2002 | Thorson et al. |
| 2002/0180554 A1 | 12/2002 | Clark et al. |
| 2003/0111909 A1 | 6/2003 | Liu et al. |
| 2003/0146765 A1 | 8/2003 | Darshan et al. |
| 2003/0147353 A1 | 8/2003 | Clarkson et al. |
| 2004/0095907 A1 | 5/2004 | Agee et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0165573 A1 | 8/2004 | Kubler et al. |
| 2004/0203704 A1 | 10/2004 | Ommodt et al. |
| 2004/0230846 A1 | 11/2004 | Mancey et al. |
| 2005/0047030 A1 | 3/2005 | Lee |
| 2005/0147071 A1 | 7/2005 | Karaoguz et al. |
| 2005/0197094 A1 | 9/2005 | Darshan et al. |
| 2005/0226625 A1 | 10/2005 | Wake et al. |
| 2005/0262364 A1 | 11/2005 | Diab et al. |
| 2005/0272439 A1 | 12/2005 | Picciriello et al. |
| 2006/0053324 A1 | 3/2006 | Giat et al. |
| 2006/0084379 A1 | 4/2006 | O'Neill |
| 2006/0192434 A1 | 8/2006 | Vrla et al. |
| 2006/0274704 A1 | 12/2006 | Desai et al. |
| 2007/0004467 A1 | 1/2007 | Chary |
| 2007/0058332 A1 | 3/2007 | Canterbury et al. |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0166050 A1 | 7/2007 | Horio et al. |
| 2007/0224954 A1 | 9/2007 | Gopi |
| 2007/0286599 A1 | 12/2007 | Sauer et al. |
| 2007/0291732 A1 | 12/2007 | Todd et al. |
| 2007/0297005 A1 | 12/2007 | Montierth et al. |
| 2008/0002614 A1 | 1/2008 | Hanabusa et al. |
| 2008/0043714 A1 | 2/2008 | Pernu |
| 2008/0044186 A1 | 2/2008 | George et al. |
| 2008/0045271 A1 | 2/2008 | Azuma |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |

(56) References Cited

U.S. PATENT DOCUMENTS

| | | |
|---|---|---|
| 2008/0129634 A1 | 6/2008 | Pera et al. |
| 2008/0134194 A1 | 6/2008 | Liu |
| 2008/0164890 A1 | 7/2008 | Admon et al. |
| 2008/0166094 A1 | 7/2008 | Bookbinder et al. |
| 2008/0167931 A1 | 7/2008 | Gerstemeier et al. |
| 2008/0186143 A1 | 8/2008 | George et al. |
| 2008/0207253 A1 | 8/2008 | Jaakkola et al. |
| 2008/0251071 A1 | 10/2008 | Armitstead et al. |
| 2008/0252307 A1 | 10/2008 | Schindler |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0272725 A1 | 11/2008 | Bojrup et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2009/0007192 A1 | 1/2009 | Singh |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0040027 A1 | 2/2009 | Nakao |
| 2009/0055672 A1 | 2/2009 | Burkland et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0100275 A1 | 4/2009 | Chang et al. |
| 2009/0121548 A1 | 5/2009 | Schindler et al. |
| 2009/0149221 A1 | 6/2009 | Liu et al. |
| 2009/0169163 A1 | 7/2009 | Abbott, III et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0280854 A1 | 11/2009 | Khan et al. |
| 2009/0285147 A1 | 11/2009 | Subasic et al. |
| 2010/0002626 A1 | 1/2010 | Schmidt et al. |
| 2010/0027443 A1 | 2/2010 | LoGalbo et al. |
| 2010/0054746 A1 | 3/2010 | Logan |
| 2010/0056184 A1 | 3/2010 | Vakil et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0240302 A1 | 9/2010 | Buczkiewicz et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0290355 A1 | 11/2010 | Roy et al. |
| 2010/0290787 A1 | 11/2010 | Cox |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0322206 A1 | 12/2010 | Hole et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0055861 A1 | 3/2011 | Covell et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0105110 A1 | 5/2011 | Carmon et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0172841 A1 | 7/2011 | Forbes, Jr. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0241425 A1 | 10/2011 | Hunter, Jr. et al. |
| 2011/0244887 A1 | 10/2011 | Dupray et al. |
| 2011/0249715 A1 | 10/2011 | Choi et al. |
| 2011/0256878 A1 | 10/2011 | Zhu et al. |
| 2011/0260939 A1* | 10/2011 | Korva ............... H01Q 1/243 343/725 |
| 2011/0266999 A1 | 11/2011 | Yodfat et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2012/0009926 A1 | 1/2012 | Hevizi et al. |
| 2012/0033676 A1 | 2/2012 | Mundra et al. |
| 2012/0063377 A1 | 3/2012 | Osterling et al. |
| 2012/0099448 A1 | 4/2012 | Matsuo et al. |
| 2012/0106442 A1 | 5/2012 | Xiao |
| 2012/0120995 A1 | 5/2012 | Wurth |
| 2012/0122405 A1 | 5/2012 | Gerber et al. |
| 2012/0163829 A1 | 6/2012 | Cox |
| 2012/0196611 A1 | 8/2012 | Venkatraman et al. |
| 2012/0214538 A1 | 8/2012 | Kim et al. |
| 2012/0289224 A1 | 11/2012 | Hallberg et al. |
| 2012/0293390 A1 | 11/2012 | Shoemaker et al. |
| 2012/0307876 A1 | 12/2012 | Trachewsky et al. |
| 2012/0317426 A1 | 12/2012 | Hunter, Jr. et al. |
| 2012/0319916 A1* | 12/2012 | Gears ............... H01Q 1/525 343/841 |
| 2013/0017863 A1 | 1/2013 | Kummetz et al. |
| 2013/0035047 A1 | 2/2013 | Chen et al. |
| 2013/0040676 A1 | 2/2013 | Kang et al. |
| 2013/0049469 A1 | 2/2013 | Huff et al. |
| 2013/0094425 A1 | 4/2013 | Soriaga et al. |
| 2013/0102309 A1 | 4/2013 | Chande et al. |
| 2013/0132683 A1 | 5/2013 | Ajanovic et al. |
| 2013/0137411 A1 | 5/2013 | Marin |
| 2013/0188959 A1 | 7/2013 | Cune et al. |
| 2013/0225182 A1 | 8/2013 | Singh et al. |
| 2013/0225183 A1 | 8/2013 | Meshkati et al. |
| 2013/0235726 A1 | 9/2013 | Frederiksen et al. |
| 2013/0249292 A1* | 9/2013 | Blackwell, Jr. .. H04B 10/25753 307/31 |
| 2013/0260706 A1* | 10/2013 | Singh ............... H04W 88/085 455/257 |
| 2013/0295980 A1 | 11/2013 | Reuven et al. |
| 2013/0330086 A1 | 12/2013 | Berlin et al. |
| 2013/0337750 A1 | 12/2013 | Ko |
| 2014/0024402 A1 | 1/2014 | Singh |
| 2014/0037294 A1 | 2/2014 | Cox et al. |
| 2014/0050482 A1 | 2/2014 | Berlin et al. |
| 2014/0075217 A1 | 3/2014 | Wong et al. |
| 2014/0087742 A1 | 3/2014 | Brower et al. |
| 2014/0089688 A1 | 3/2014 | Man et al. |
| 2014/0097846 A1 | 4/2014 | Lemaire et al. |

(56) References Cited

U.S. PATENT DOCUMENTS

| | | | |
|---|---|---|---|
| 2014/0146692 A1 | 5/2014 | Hazani et al. | |
| 2014/0148214 A1 | 5/2014 | Sasson | |
| 2014/0153919 A1 | 6/2014 | Casterline et al. | |
| 2014/0169246 A1 | 6/2014 | Chui et al. | |
| 2014/0233442 A1 | 8/2014 | Atias et al. | |
| 2014/0293894 A1 | 10/2014 | Saban et al. | |
| 2014/0308043 A1 | 10/2014 | Heidler et al. | |
| 2014/0308044 A1 | 10/2014 | Heidler et al. | |
| 2015/0082066 A1 | 3/2015 | Bose et al. | |
| 2015/0098350 A1 | 4/2015 | Mini et al. | |
| 2015/0249513 A1 | 9/2015 | Schwab et al. | |
| 2015/0380928 A1* | 12/2015 | Saig | H02H 7/20 361/54 |
| 2016/0173291 A1 | 6/2016 | Hazani et al. | |
| 2017/0055207 A1 | 2/2017 | Hagage et al. | |

FOREIGN PATENT DOCUMENTS

| | | |
|---|---|---|
| CN | 101232179 A | 7/2008 |
| CN | 101803246 A | 8/2010 |
| CN | 101876962 A | 11/2010 |
| EP | D851618 A2 | 7/1998 |
| EP | 0924881 A2 | 6/1999 |
| EP | 1227605 A2 | 7/2002 |
| EP | 1347584 A2 | 9/2003 |
| EP | 1954019 A1 | 8/2008 |
| GB | 2275834 A | 9/1994 |
| JP | 58055770 A | 4/1983 |
| JP | 2002353813 A | 12/2002 |
| KR | 20040053467 A | 6/2004 |
| KR | 1031619 B1 | 4/2011 |
| WO | 9603823 A1 | 2/1996 |
| WO | 0072475 A1 | 11/2000 |
| WO | 0184760 A1 | 11/2001 |
| WO | 03024027 A1 | 3/2003 |
| WO | 2005117337 A1 | 12/2005 |
| WO | 2006077569 A1 | 7/2006 |
| WO | 2006077570 A1 | 7/2006 |
| WO | 2008083317 A1 | 7/2008 |
| WO | 2009014710 A1 | 1/2009 |
| WO | 2009145789 A1 | 12/2009 |
| WO | 2010090999 A1 | 8/2010 |
| WO | 2010132292 A1 | 11/2010 |
| WO | 2011123314 A1 | 10/2011 |
| WO | 2012051227 A1 | 4/2012 |
| WO | 2012051230 A1 | 4/2012 |
| WO | 2012064333 A1 | 5/2012 |
| WO | 2012071367 A1 | 5/2012 |
| WO | 2012103822 A2 | 8/2012 |
| WO | 2012115843 A1 | 8/2012 |
| WO | 2015049671 A2 | 4/2015 |

OTHER PUBLICATIONS

International Preliminary Report on Patentability for PCT/US2010/056458 mailed May 23, 2013, 9 pages.
Non-final Office Action for U.S. Appl. No. 13/410,916 mailed Jul. 18, 2012, 13 pages.
Notice of Allowance for U.S. Appl. No. 13/410,916 mailed Aug. 9, 2012, 9 pages.
Author Unknown, "MDS SDx Packaged Stations," Technical Manual, MDS 05-6312A01, Revision B, May 2011, GE MDS, LLC, Rochester, New York, 44 pages.
Author Unknown, "Quad Integrated IEEE 802.3at PSE Controller and Power Management System with up to 30W per Port Capabilities," Product Brief, BCM59103, Broadcom Corporation, Oct. 12, 2009, 2 pages.
Author Unknown, "Quad IEEE 802.3at Power Over Ethernet Controller," Product Brief, LTC4266, Linear Technology Corporation, 2009, 2 pages.
Author Unknown, "Single IEEE 802.3at Power Over Ethernet Controller," Product Brief, LTC4274, Linear Technology Corporation, 2009, 2 pages.
Author Unknown, "TPS23841: High-Power, Wide Voltage Range, Quad-Port Ethernet Power Sourcing Equipment Manager," Texas Instruments Incorporated, Nov. 2006, Revised May 2007, 48 pages.
International Search Report for PCT/US2010/034005 mailed Aug. 12, 2010, 4 pages.
International Preliminary Report on Patentability for PCT/US2010/034005 mailed Nov. 24, 2011, 7 pages.
International Search Report for PCT/US2011/055858 mailed Feb. 7, 2012, 4 pages.
International Preliminary Report on Patentability for PCT/US2011/055858 mailed Apr. 25, 2013, 8 pages.
International Search Report for PCT/US2011/055861 mailed Feb. 7, 2012, 4 pages.
International Preliminary Report on Patentability for PCT/US2011/055861 mailed Apr. 25, 2013, 9 pages.
International Search Report for PCT/US2011/061761 mailed Jan. 26, 2012, 3 pages.
International Preliminary Report on Patentability for PCT/US2011/061761 mailed Jun. 6, 2013, 9 pages.
Translation of the the First Office Action for Chinese Patent Application No. 201180059270.4 issued May 13, 2015, 19 pages.
International Search Report for PCT/US2013/058937 mailed Jan. 14, 2014, 4 pages.
International Preliminary Report on Patentability for PCT/US2013/058937 mailed Apr. 9, 2015, 7 pages.
Non-final Office Action for U.S. Appl. No. 13/626,371 mailed Dec. 13, 2013, 15 pages.
Non-final Office Action for U.S. Appl. No. 13/626,371 mailed Jun. 25, 2014, 16 pages.
Notice of Allowance for U.S. Appl. No. 13/626,371 mailed Nov. 25, 2014, 7 pages.
Notice of Allowance for U.S. Appl. No. 13/626,371 mailed Aug. 3, 2015, 7 pages.
Non-final Office Action for U.S. Appl. No. 13/859,985 mailed Feb. 27, 2015, 15 pages.
Final Office Action for U.S. Appl. No. 13/859,985 mailed Jul. 22, 2015, 8 pages.
Non-final Office Action for U.S. Appl. No. 13/860,017 mailed Feb. 27, 2015, 15 pages.
Final Office Action for U.S. Appl. No. 13/860,017 mailed Jul. 23, 2015, 8 pages.
Non-Final Office Action for U.S. Appl. No. 13/950,397, mailed Mar. 17, 2015, 6 pages.
Notice of Allowance for U.S. Appl. No. 13/950,397, mailed Jun. 10, 2015, 7 pages.
Non-Final Office Action for U.S. Appl. No. 13/771,756 mailed Sep. 10, 2014, 26 pages.
Final Office Action for U.S. Appl. No. 13/771,756 mailed Apr. 30, 2015, 38 pages.
International Search Report for PCT/IL2013/050976, mailed Mar. 18, 2014, 3 pages.
Translation of the First Office Action for Chinese Patent Application No. 201180053270.3 issued May 26, 2015, 17 pages.
Translation of the First Office Action for Chinese Patent Application No. 201180052537.7 issued Jun. 25, 2015, 9 pages.
Non-final Office Action for U.S. Appl. No. 13/687,457 mailed Jul. 30, 2015, 12 pages.
Advisory Action for U.S. Appl. No. 13/771,756, mailed Aug. 21, 2015, 4 pages.
Non-final Office Action for U.S. Appl. No. 13/899,118, mailed Jan. 6, 2016, 10 pages.
Non-final Office Action for U.S. Appl. No. 14/845,768, mailed Nov. 19, 2015, 12 pages.
Non-final Office Action for U.S. Appl. No. 14/845,946, mailed Dec. 17, 2015, 11 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Author Unknown, "INT6400/INT1400: HomePlug AV Chip Set," Product Brief, Atheros Powerline Technology, 27003885 Revision 2, Atheros Communications, Inc., 2009, 2 pages.

(56) References Cited

OTHER PUBLICATIONS

Author Unknown, "MegaPlug AV: 200 Mbps Ethernet Adapter," Product Specifications, Actiontec Electronics, Inc., 2010, 2 pages.
Cho, Bong Youl et al. "The Forward Link Performance of a PCS System with an AGC," 4th CDMA International conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
International Preliminary Report on Patentability for PCT/US2011/061761 mailed May 28, 2013, 8 pages.
Author Unknown, "Equivalent Circuits—(Thevenin and Norton)," Bucknell Lecture Notes, Wayback Machine, Mar. 25, 2010, http://www.facstaff.bucknell.edu/mastascu/elessonsHTML/Source/Source2.html, 15 pages.
International Search Report and Written Opinion for PCT/IL2014/050766, mailed Nov. 11, 2014, 12 pages.
International Preliminary Report on Patentability for PCT/IL2014/050766, mailed Mar. 10, 2016, 9 pages.
Advisory Action and Applicant-Initiated Interview Summary for U.S. Appl. No. 13/687,457, mailed May 13, 2016, 5 pages.
Non-final Office Action for U.S. Appl. No. 13/687,457, mailed Jun. 27, 2016, 30 pages.
Non-final Office Action for U.S. Appl. No. 13/899,118, mailed Jun. 30, 2016, 11 pages.
Final Office Action for U.S. Appl. No. 14/317,475, mailed May 26, 2016, 12 pages.
Notice of Allowance for U.S. Appl. No. 14/317,475, mailed Aug. 5, 2016, 7 pages.
Notice of Allowance for U.S. Appl. No. 14/845,768, mailed Apr. 11, 2016, 8 pages.
Notice of Allowance for U.S. Appl. No. 14/845,946, mailed Jun. 8, 2016, 7 pages.
International Search Report and Written Opinion for PCT/IL2014/051012, mailed Mar. 5, 2015, 11 pages.
International Search Report and Written Opinion for PCT/IL2015/050656, mailed Oct. 8, 2015, 9 pages.
The Second Office Action for Chinese Patent Application No. 201180059270.4, mailed Jan. 28, 2016, 42 pages.
Final Office Action for U.S. Appl. No. 13/687,457, mailed Feb. 12, 2016, 22 pages.
Notice of Allowance for U.S. Appl. No. 13/771,756, mailed Jan. 29, 2016, 14 pages.
Non-final Office Action for U.S. Appl. No. 14/317,475, mailed Feb. 3, 2016, 12 pages.
International Search Report and Written Opinion PCT/IL2016/050306 Dated Jun. 8, 2016.
The Third Office Action for Chinese Patent Application No. 201180059270.4, issued Aug. 23, 2016, 6 pages.
Non-Final Office Action for U.S. Appl. No. 14/845,929, mailed Nov. 7, 2016, 5 pages.
Non-Final Office Action for U.S. Appl. No. 14/845,946, mailed Sep. 9, 2016, 10 pages.
Non-Final Office Action for U.S. Appl. No. 14/884,317, mailed Aug. 31, 2016, 16 pages.
Non-Final Office Action for U.S. Appl. No. 14/853,118, mailed Aug. 12, 2016, 7 pages.
Translation of the Fourth Office Action for Chinese Patent Application No. 201180059270.4, mailed Jan. 20, 2017, 6 pages.
Final Office Action for U.S. Appl. No. 13/687,457, mailed Feb. 10, 2017, 33 pages.
Notice of Allowance for U.S. Appl. No. 13/899,118, mailed Jan. 12, 2017, 7 pages.
Non-Final Office Action for U.S. Appl. No. 14/884,317, mailed Feb. 13, 2017, 17 pages.
Author Unknown, "Fiber Optic Distributed Antenna System," Installation and Users Guide, ERAU Version 1.5, May 2002, Andrews Corporation, 53 pages.
Advisory Action for U.S. Appl. No. 13/687,457, dated May 24, 2017, 7 pages.
Notice of Allowance for U.S Appl. No, 14/845,929, dated May 9, 2017, 7 pages.
Notice of Allowance and Examiner-Initiated Interview Summary for U.S. Appl. No. 14/845,946, dated Apr. 20, 2017, 10 pages.
Non-Final Office Action for U.S. Appl. No. 15/156,556, dated Apr. 11. 2017, 13 pages.

\* cited by examiner

COMBINING POWER FROM ELECTRICALLY ISOLATED POWER PATHS FOR POWERING REMOTE UNITS IN A DISTRIBUTED ANTENNA SYSTEM(S) (DASS)

CROSS-REFERENCE TO RELATED APPLICATION

This application claims the benefit of priority under 35 U.S.C. §119 of U.S. Provisional Application No. 62/139,137 filed on Mar. 27, 2015, the content of which is relied upon and incorporated herein by reference in its entirety.

BACKGROUND

The technology of the present disclosure relates generally to combining power from electrically isolated power paths for powering remote units in distributed antenna systems (DASs).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 100(1)-100(N) of a DAS 102, wherein 'N' is the number of coverage areas. These communications services can include cellular services, wireless services such as RFID tracking, Wireless Fidelity (WiFi), local area network (LAN), WLAN, and combinations thereof, as examples. The coverage areas 100(1)-100(N) may be remotely located. In this regard, the remote coverage areas 100(1)-100(N) are created by and centered on remote units 104(1)-104(N) connected to a central unit 106 (e.g., a head-end controller or head-end unit). The central unit 106 may be communicatively coupled to a base station 108. If the DAS 102 is a broadband DAS, the central unit 106 receives downlink communications signals 110D in multiple frequency bands for different communications services from the base station 108 to be distributed to the remote units 104(1)-104(N). The remote units 104(1)-04(N) are configured to receive downlink communications signals 110D from the central unit 106 over a communications medium 112 to be distributed as downlink communications signals 110D to the respective coverage areas 100(1)-100(N) of the remote units 104(1)-104(N). Each remote unit 104(1)-104(N) may include an RF transmitter/receiver (not shown) and a respective antenna 114(1)-114(N) operably connected to the RF transmitter/receiver to wirelessly distribute the communications services to client devices 116 within their respective coverage areas 100(1)-100(N). The remote units 104(1)-104(N) are also configured to receive uplink communications signals 110U in multiple frequency bands over antennas 114(1)-114(N) from the client devices 116 in their respective coverage areas 100(1)-100(N) to be distributed over the communications medium 112 to the central unit 106.

Power is provided from one or more power sources to the remote units 104(1)-104(N) in the DAS 102 to provide power for the power-consuming components in the remote units 104(1)-104(N). For example, the remote units 104(1)-104(N) may receive power P over long wire electrical conductor pairs 118 ("wire pair 118") provided in the communications medium 112 from one or more power sources 120 ("power source 120"). For example, the power source 130 may be remote to the remote units 104(1)-104(N) and provided at the central unit 106 or other location in the DAS 102. The power source 120 may be either an alternative current (AC) or direct current (DC) power supply. Each wire pair 118 may carry a limited amount of current or voltage, which may be dictated by safety regulations or by physical properties of the wire pairs 118, such as their diameter and length. However, in some cases, one or more of the remote units 104(1)-104(N) may require more power than can be carried by a single wire pair 118. For example, NEC (National Electrical Code) Class 2 directives may limit the power that can be provided by a single power supply to 100 VA (Volt-Ampere).

One solution to deliver more power to the remote units 104(1)-104(N) is to connect multiple wire pairs 118 from multiple power output ports 122(1)-122(X) to each remote unit 104(1)-104(N). In this arrangement, each wire pair 118 provides power up to its limited power level. However, the power provided by all wire pairs 118 can be combined in parallel to provide a greater combined power to a remote unit 104(1)-104(N). However, the voltages at the end of each wire pair 118 may be different due to different voltage drop on the wires, differences in the adjustment of the power supply 120, and/or differences in components' tolerances in the power output ports 122(1)-122(X) of the power supply 120. If the voltages at the end of each wire pair 118 are not equal, this will cause the power supply 120 to distribute different current and thus different power P on power output ports 122(1)-122(X) to a remote unit 104(1)-104(N). In such case, some power output ports 122(1)-122(X) will deliver lower power while the other power output ports 122(1)-122(X) will deliver higher power. If power P pulled by the power supply 120 reaches the limit allowed by safety regulations or capabilities for a given power output port(s) 122(1)-122(X), the power supply 120 may shut down thereby interrupting power P to the remote units 104(1)-104(N).

No admission is made that any reference cited herein constitutes prior art. Applicant expressly reserves the right to challenge the accuracy and pertinency of any cited documents.

SUMMARY

Embodiments disclosed herein include combining of power from electrically isolated power paths for powering remote units in distributed antenna systems (DASs). In this regard, in one example, one or more remote units in a DAS include multiple input power ports for receiving power from multiple power paths. Each power path is capable of distributing a given maximum power based on its respective power supply and the power handling capability of the respective power path. The received power from each input power port in a remote unit is combined to provide a combined output power for powering the remote unit. In this manner, the remote unit can be powered by the combined output power if the remote unit requires more power for operation than can be supplied over a single power path. To avoid differences in received power on the multiple input power ports causing a power supply from providing higher power than designed or regulated, the input power ports in the remote unit are electrically isolated from each other. Further, in some embodiments, to provide for the received power on the multiple power inputs ports to be proportionally provided in the combined power according to the maximum power supplying capabilities of the respective power supplies, a controller is provided. The controller is configured to selectively control the amount of power provided from each power input port to the combined output power, based on the determined available power on each multiple input power port.

By proportionally combining power from electrically isolated power paths in a remote unit based on the power supplying capability of the respective power supplies, the remote unit can tolerate inaccuracies in the output power from the power supplies. For example, the type and length of wires used in the power paths for delivering power to the power input ports of a remote unit can cause the remote unit to draw power beyond the limits or regulations of a given power supply. This can simplify installation procedures for power supplies and remote units in a DAS, because in-field calibrations of power supplies by technicians based on variations in power supplies and power paths may be avoided. The remote unit can work with multiple types of power supplies, which can have different power delivery capabilities or regulations.

One embodiment of the disclosure relates to a remote unit for a distributed antenna system (DAS). The remote unit comprises a plurality of internal power paths each configured to carry power to a combined power node coupled to at least one remote unit load to provide a combined output power to the at least one remote unit load. The remote unit also comprises a plurality of input power ports provided in a respective internal power path among the plurality of internal power paths, each input power port among the plurality of input power ports configured to receive input power from a respective external power path in a DAS. The remote unit also comprises a plurality of isolation circuits provided in a respective internal power path among the plurality of internal power paths. Each isolation circuit among the plurality of isolation circuits is configured to receive the input power from the respective input power port and provide an electrically isolated output power based on the received input power at the combined power node to provide the combined output power. The remote unit also comprises a plurality of control circuits provided between the combined power node and the plurality of isolation circuits in a respective internal power path among the plurality of internal power paths to control the electrically isolated output power provided to the combined power node. The remote unit also comprises a controller configured to selectively control the plurality of control circuits to control the electrically isolated output power delivered from each isolation circuit in the respective internal power path to the combined power node into the combined output power.

Another embodiment of the disclosure relates to a method of combining power received from multiple input ports in a remote unit for a DAS. The method comprises receiving input power from a plurality of external power paths in a DAS into a plurality of input power ports each provided in a respective internal power path among a plurality of internal power paths. The method also comprises providing a plurality of electrically isolated output powers based on the received input power from a respective input power port among the plurality of input power ports. The method also comprises selectively controlling an amount of electrically isolated output power delivered in each respective internal power path, to a combined power node into a combined output power to be provided to at least one remote unit load.

Another embodiment of the disclosure relates to a DAS. The DAS comprises a central unit. The central unit is configured to distribute at least one downlink communications signal over at least one communications medium to at least one remote unit among a plurality of remote units. The central unit is also configured to receive at least one uplink communications signal over the at least one communications medium from at least one remote unit among the plurality of remote units. Each of the plurality of remote units is configured to receive the at least one downlink communications signal over the at least one communications medium from the central unit and distribute the received at least one downlink communications signal from the central unit to at least one client device. Each of the plurality of remote units is also configured to receive the at least one uplink communications signal from the at least one client device and distribute the received at least one uplink communications signal over the at least one communications medium to the central unit. Each of the plurality of remote units further comprises a plurality of internal power paths each configured to carry power to a combined power node coupled to at least one remote unit load to provide a combined output power to the at least one remote unit load. Each of the plurality of remote units further comprises a plurality of input power ports provided in a respective internal power path among the plurality of internal power paths, each input power port among the plurality of input power ports configured to receive input power from a respective external power path in a DAS. Each of the plurality of remote units further comprises a plurality of isolation circuits provided in a respective internal power path among the plurality of internal power paths. Each isolation circuit among the plurality of isolation circuits is configured to receive the input power from a respective input power port and provide an electrically isolated output power based on the received input power at the combined power node to provide the combined output power. Each of the plurality of remote units further comprises a plurality of control circuits provided between the combined power node and the plurality of isolation circuits in a respective internal power path among the plurality of internal power paths. Each of the plurality of remote units further comprises a controller configured to selectively control an amount of electrically isolated output power delivered from the isolation circuit in the respective internal power path, to the combined power node into the combined output power.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification.

DETAILED DESCRIPTION

Various embodiments will be further clarified by the following examples.

Embodiments disclosed herein include combining of power from electrically isolated power paths for powering remote units in distributed antenna systems (DASs). In this regard, in one example, one or more remote units in a DAS include multiple input power ports for receiving power from multiple power paths. Each power path is capable of distributing a given maximum power based on its respective power supply and the power handling capability of the respective power path. The received power from each input power port in a remote unit is combined to provide a combined output power for powering the remote unit. In this manner, the remote unit can be powered by the combined output power if the remote unit requires more power for operation than can be supplied over a single power path. To avoid differences in received power on the multiple input power ports causing a power supply from providing higher power than designed or regulated, the input power ports in the remote unit are electrically isolated from each other. Further, in some embodiments, to provide for the received power on the multiple power inputs ports to be proportionally provided in the combined output power according to the maximum power supplying capabilities of the respective power supplies, a controller is provided. The controller is configured to selectively control the amount of power provided from each power input port to the combined output power, based on the determined available power on each multiple input power port.

By proportionally combining power from electrically isolated power paths in a remote unit based on the power supplying capability of the respective power supplies, the remote unit can tolerate inaccuracies in the output power from the power supplies. For example, the type and length of wires used in the power paths for delivering power to the power input ports of a remote unit can cause the remote unit to draw power beyond the limits or regulations of a given power supply. This can simplify installation procedures for power supplies and remote units in a DAS, because in-field calibrations of power supplies by technicians based on variations in power supplies and power paths may be avoided. The remote unit can work with multiple types of power supplies, which can have different power delivery capabilities or regulations.

Figure 1:
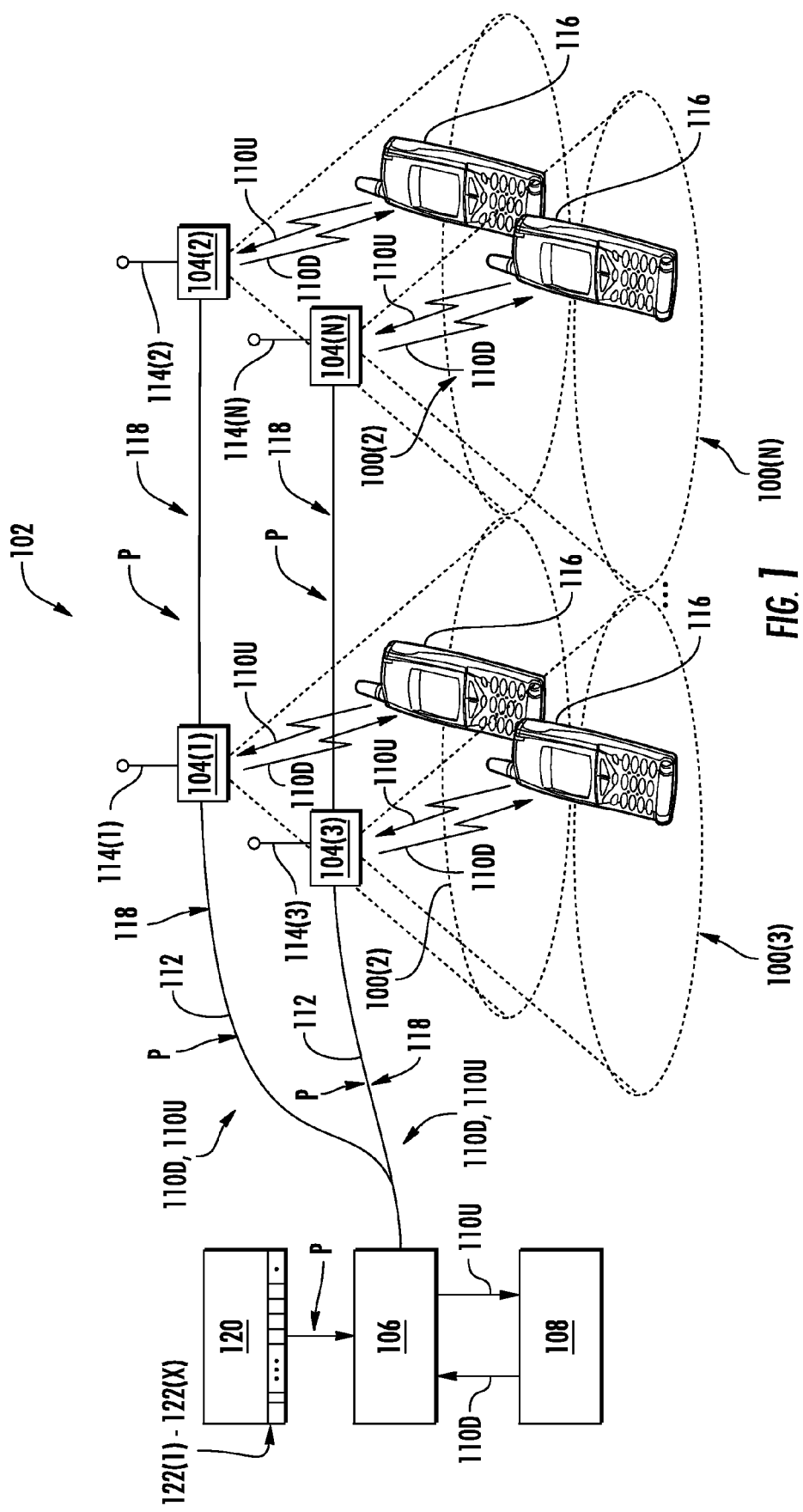
FIG. 1 is a schematic diagram of an exemplary distributed antenna system (DAS) capable of distributing radio frequency (RF) communications services to client devices.
Figure 2:
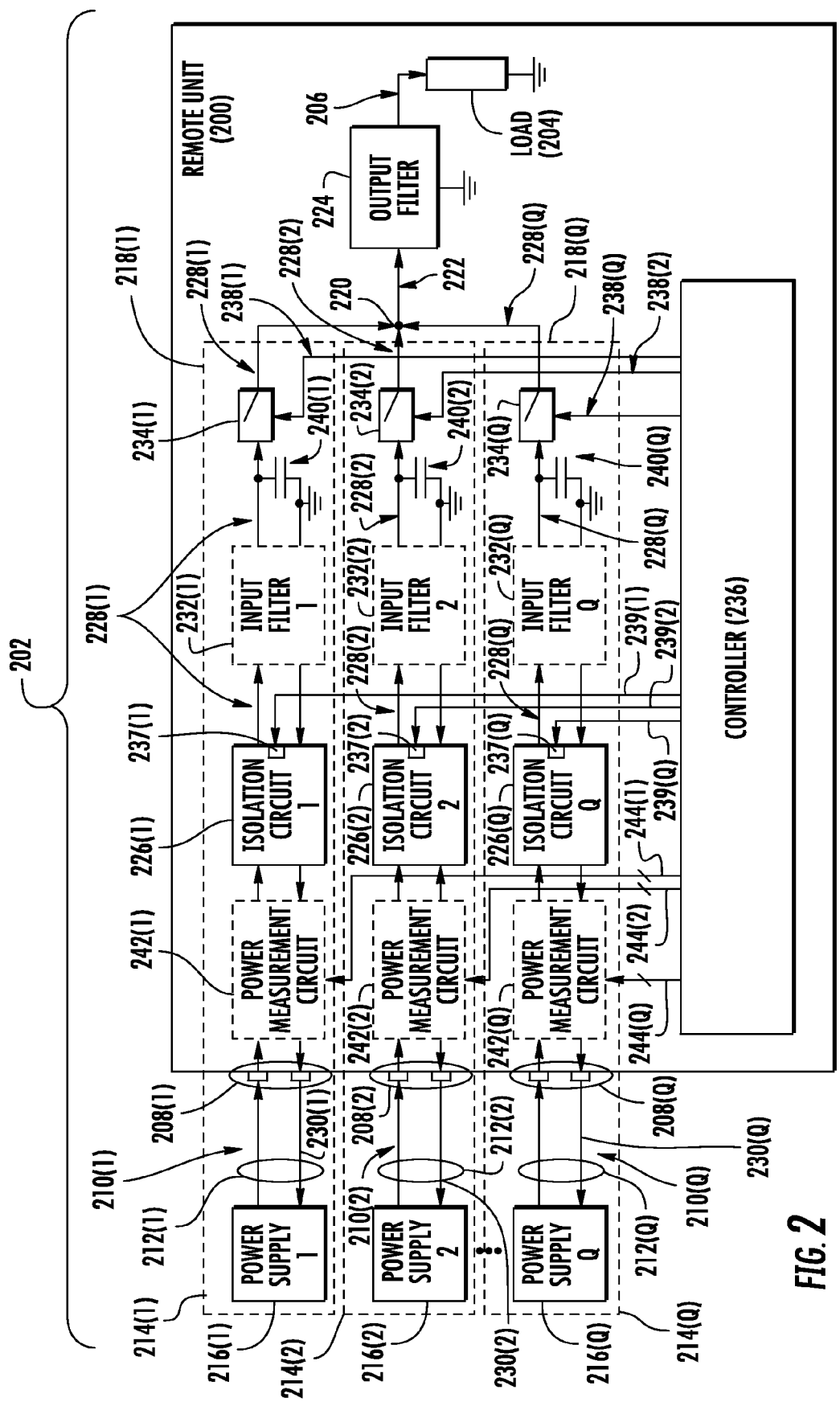
FIG. 2 is a schematic diagram of an exemplary remote unit that can be provided in a DAS, wherein the remote unit is configured to combine received power from electrically isolated power ports each receiving power from respective external power paths, for powering the remote unit.

In this regard, FIG. 2 is a schematic diagram of an exemplary remote unit 200 that can be provided in a DAS. Note that a plurality of the remote units 200 may be provided in a DAS. The remote unit 200 is configured to distribute communications services in a DAS 202. These communications services are provided by power-consuming components represented by a remote unit load 204 ("load 204") in FIG. 2. Note that the load 204 can represent multiple different loads in the remote unit 200. The remote unit 200 is configured to provide an output power 206 to the load 204 for operations. If the load 204 requires more power to operate than can be provided by a single power supply over a single power wire pair to the remote unit 200, the remote unit 200 can be configured to receive input power in multiple input power ports over multiple respective power paths in the DAS 202. In this regard, the remote unit 200 in FIG. 2 contains multiple input power ports 208(1)-208(Q). 'Q' signifies that any number of input power ports 208 desired can be provided in the remote unit 200. Each input power port 208(1)-208(Q) is configured to receive input power 210(1)-210(Q) from a respective power wire pair 212(1)-212(Q) from a respective external power path 214(1)-214(Q) in the DAS 202. Multiple power supplies 216(1)-216(Q) are provided in the DAS 202 to supply the input power 210(1)-210(Q) over the respective power wire pairs 212(1)-212(Q) in the external power path 214(1)-214(Q) to the remote unit 200. The power supplies 216(1)-216(Q) may be located at the remote unit 200 or remotely from the remote unit 200. Each external power path 214(1)-214(Q) is capable of distributing a given maximum input power 210(1)-210(Q) based on the respective power supply 216(1)-216(Q) and the power handling capability of the respective power wire pair 212(1)-212(Q). In this manner, the remote unit 200 is configured to receive the input power 210(1)-210(Q) from the multiple power supplies 216(1)-216(Q) in case the power needed to power the load 204 is greater than can be supplied by a single power supply 216 among the multiple power supplies 216(1)-216(Q). For example, there may be restrictions on the maximum power that can be supplied by a power supply over a power wire pair 212 to the remote unit 200.

With continuing reference to FIG. 2, the remote unit 200 includes a plurality of internal power paths 218(1)-218(Q) for routing the received input power 210(1)-210(Q) from the input power ports 208(1)-208(Q) to the load 204. Each of the internal power paths 218(1)-218(Q) are coupled to a combined power node 220 to provide a combined output power 222 for powering the load 204. In the remote unit 200 in FIG. 2, an output filter 224 is provided to filter the combined output power 222 into the output power 206 provided to the load 204.

To avoid differences in the received input power 210(1)-210(Q) on the multiple input power ports 208(1)-208(Q) causing a power supply 216(1)-216(Q) from providing higher power than designed or regulated, the input power ports 208(1)-208(Q) in the remote unit 200 are electrically isolated from each other. In this regard, a plurality of isolation circuits 226(1)-226(Q) are provided in respective internal power paths 218(1)-218(Q). For example, the isolation circuits 226(1)-226(Q) may be direct current (DC) to DC (DC-DC) converters if the input power 210(1)-210(Q) is DC input power to provide the output power 206 as electrically isolated DC output power. As another example, isolation circuits 226(1)-226(Q) may be alternating current (AC) to DC (AC-DC) converters if the input power 210(1)-210(Q) is AC input power to provide the output power 206 as electrically isolated DC output power. Each isolation circuit 226(1)-226(Q) is configured to receive the respective input power 210(1)-210(Q) from the respective input power port 208(1)-208(Q). Each isolation circuit 226(1)-226(Q) is further configured to provide a respective electrically isolated output power 228(1)-228(Q) to the combined power node 220. The electrically isolated output powers 228(1)-228(Q) received at the combined power node 220 are combined together to form the combined output power 222. The isolation circuits 226(1)-226(Q) are capable of providing stable electrically isolated output powers 228(1)-228(Q) to provide a stable combined output power 222. Also, by providing the isolation circuits 226(1)-226(Q) in the respective internal power paths 218(1)-218(Q), the input power 210(1)-210(Q) being higher from one or more power supplies 216(1)-216(Q) than other power supplies 216(1)-216(Q) on the return paths 230(1)-230(Q) of the respective power wire pairs 212(1)-212(Q) does not cause a greater amount of power to be pulled beyond the power supply capability limits of a respective power supply 216(1)-216(Q). Optional input filters 232(1)-232(Q) can be provided in respective internal power paths 218(1)-218(Q) to filter the electrically isolated output powers 228(1)-228(Q) before being provided to the combined power node 220.

The load 204 may not require the maximum amount of power that can be provided in the output power 206 from the contribution of the electrically isolated output powers 228(1)-228(Q) from the isolation circuits 226(1)-226(Q) to the combined power node 220. In this regard, a plurality of control circuits 234(1)-234(Q) can be provided in each internal power path 218(1)-218(Q), respectively. For example, the control circuits 234(1)-234(Q) may be switching circuits in the form of switches. An electronic controller 236 ("controller 236") is provided in the remote unit 200 that is configured to control operation of the control circuits 234(1)-234(Q) to control the amount of the electrically isolated output power 228(1)-228(Q) to be delivered and combined at the combined power node 220 in the combined output power 222. As non-limiting examples, the controller 236 may be a microcontroller, microprocessor, logic circuit, or other control circuit. In this regard, the controller 236 can selectively control the control circuits 234(1)-234(Q) to couple the electrically isolated output power 228(1)-228(Q) to the combined power node 220 or decouple the electrically isolated output power 228(1)-228(Q) from the combined power node 220. To selectively control the control circuits 234(1)-234(Q), the controller 236 is configured to provide a control signal 238(1)-238(Q) to each of the respective control circuits 234(1)-234(Q) to control the control circuits 234(1)-234(Q). As an example, the controller 236 can selectively control the control circuits 234(1)-234(Q) to provide different levels of combined output power 222 to the load 204 depending on the power needed by the load 204 for operation. The remote unit 200 may also be designed to only need to power certain portions of the load 204 based on operation of the remote unit 200.

Capacitor circuits 240(1)-240(Q) may be provided in each of the respective internal power paths 218(1)-218(Q) between the isolation circuits 226(1)-226(Q) and the control circuits 234(1)-234(Q) to store energy from the electrically isolated output power 228(1)-228(Q) to smooth out or average any power bursts of the electrically isolated output power 228(1)-228(Q). The capacitor circuits 240(1)-240(Q) may each be comprised of a single capacitor or network of capacitors.

Note that the isolation circuits 226(1)-226(Q) may have an adjustable output power input 237(1)-237(Q), in the form of a current limiter input or adjustable output voltage that can be set by the controller 236 according to adjustment signals 239(1)-239(Q). The adjustment signals 239(1)-239(Q) may be either analog or digital signals depending on the type of isolation circuits 226(1)-226(Q) employed. Using these current limiters or output voltage adjustment mechanisms, it is possible to limit the electrically isolated output power 228(1)-228(Q) delivered through each internal power path 218(1)-218(Q) to the maximum allowed combined output power 222. In case of voltage based adjustment mechanism for the isolation circuits 226(1)-226(Q), the current of the electrically isolated output power 228(1)-228(Q) of a specific isolation circuit 226 will increase or decrease depending on the voltage difference between the electrically isolated output power 228(1)-228(Q) of the specific isolation circuit 226 and the combined power node 220, divided by the resistance of the electrical path between these nodes. The series resistance includes both the respective input filter 232 and the control circuit 234 resistance. In case the resistance between an isolation circuit 226(1)-226(Q) and the combined power node 220 is too low, an additional series resistor (not shown) may be added to the output of the isolation circuits 226(1)-226(Q), to enable fine tuning of the output current or voltage of the electrically isolated output power 228(1)-228(Q).

Figure 3:
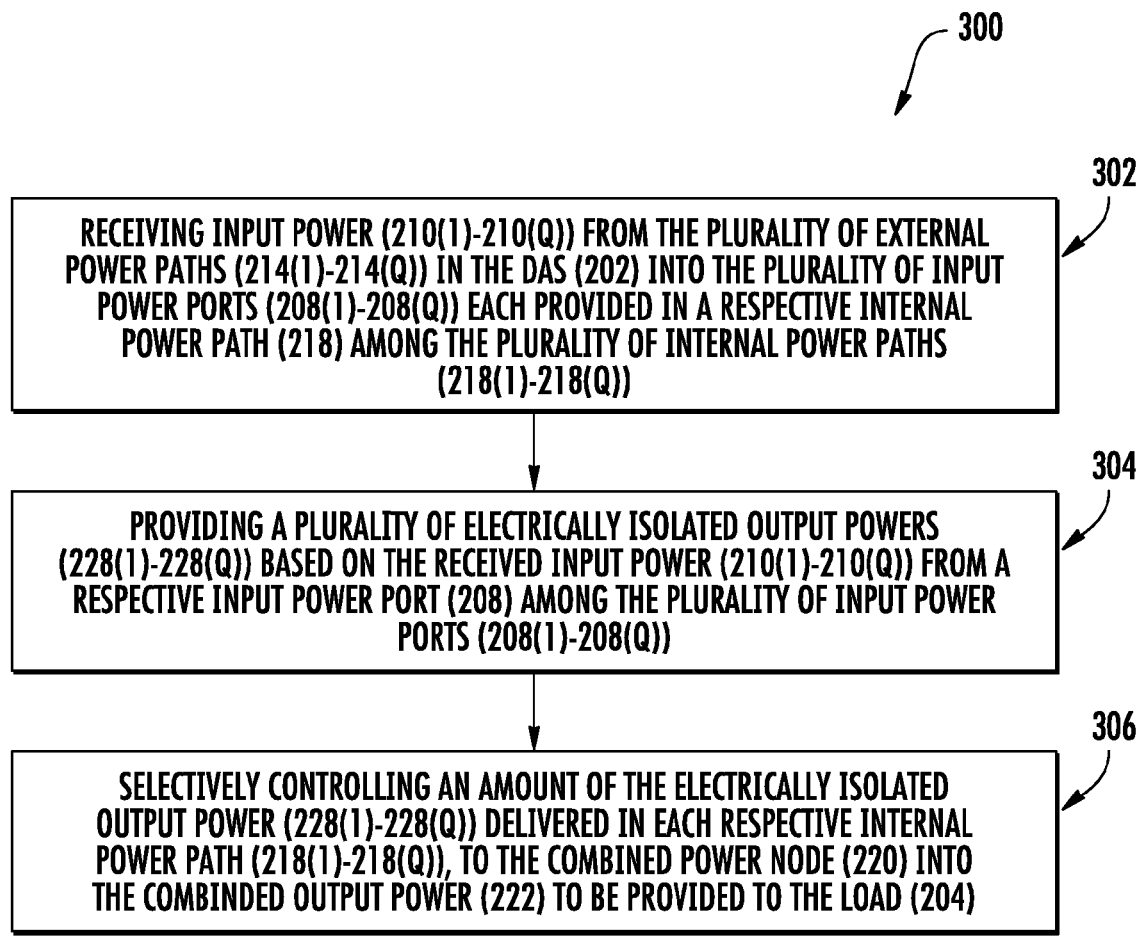
FIG. 3 is a flowchart illustrating an exemplary process of the remote unit in FIG. 2 receiving input power from a plurality of external power paths into a plurality of input power ports, and selectively controlling the contribution of power from each of the input power ports to a combined power node.

FIG. 3 is a flowchart illustrating an exemplary process 300 of the remote unit 200 in FIG. 2 receiving the input power 210(1)-210(Q) from input power ports 208(1)-208(Q) and selectively controlling the control circuits 234(1)-234(Q) to control contribution of each electrically isolated output power 228(1)-228(Q) to the combined output power 222 at the combined power node 220. In this regard, remote unit 200 receives the input power 210(1)-210(Q) from the external power paths 214(1)-214(Q) in the DAS 202 into the input power ports 208(1)-208(Q) each provided in a respective internal power path 218 among a plurality of internal power paths 218(1)-218(Q) (block 302). The isolation circuits 226(1)-226(Q) provide the electrically isolated output powers 228(1)-228(Q) based on the received input power 210(1)-210(Q) from a respective input power port 208 among the plurality of input power ports 208(1)-208(Q) (block 304). The controller 236 selectively controls an amount of the electrically isolated output power 228(1)-228(Q) delivered in each respective internal power path 218(1)-218(Q), to the combined power node 220 into the combined output power 222 to be provided to the load 204 (block 306).

It may also be desired to provide the combined output power 222 in the remote unit 200 in FIG. 2 according to the maximum power supplying capabilities of the power supplies 216(1)-216(Q). In this manner, it may be desired to provide electrically isolated output power 228(1)-228(Q) that is proportional to the power supplying capabilities of the power supplies 216(1)-216(Q). By proportionally combining electrically isolated output power 228(1)-228(Q) based on the power supplying capability of the respective power supplies 216(1)-216(Q), the remote unit 200 can tolerate inaccuracies in the output power from the power supplies 216(1)-216(Q). For example, if three (3) power supplies 216(1)-216(3) capable of providing a maximum power of 70, 80, and 90 Watts (W) respectively are provided to supply power to the remote unit 200, the maximum power available to be provided to the load 204 is 240 W (i.e., 70 W+80 W+90 W). The combined output power 222 can be provided as a proportion of electrically isolated output power 228(1)-228(3) in accordance with the relative maximum power supplying capabilities of the three (3) power supplies 216(1)-216(3).

Figure 4:
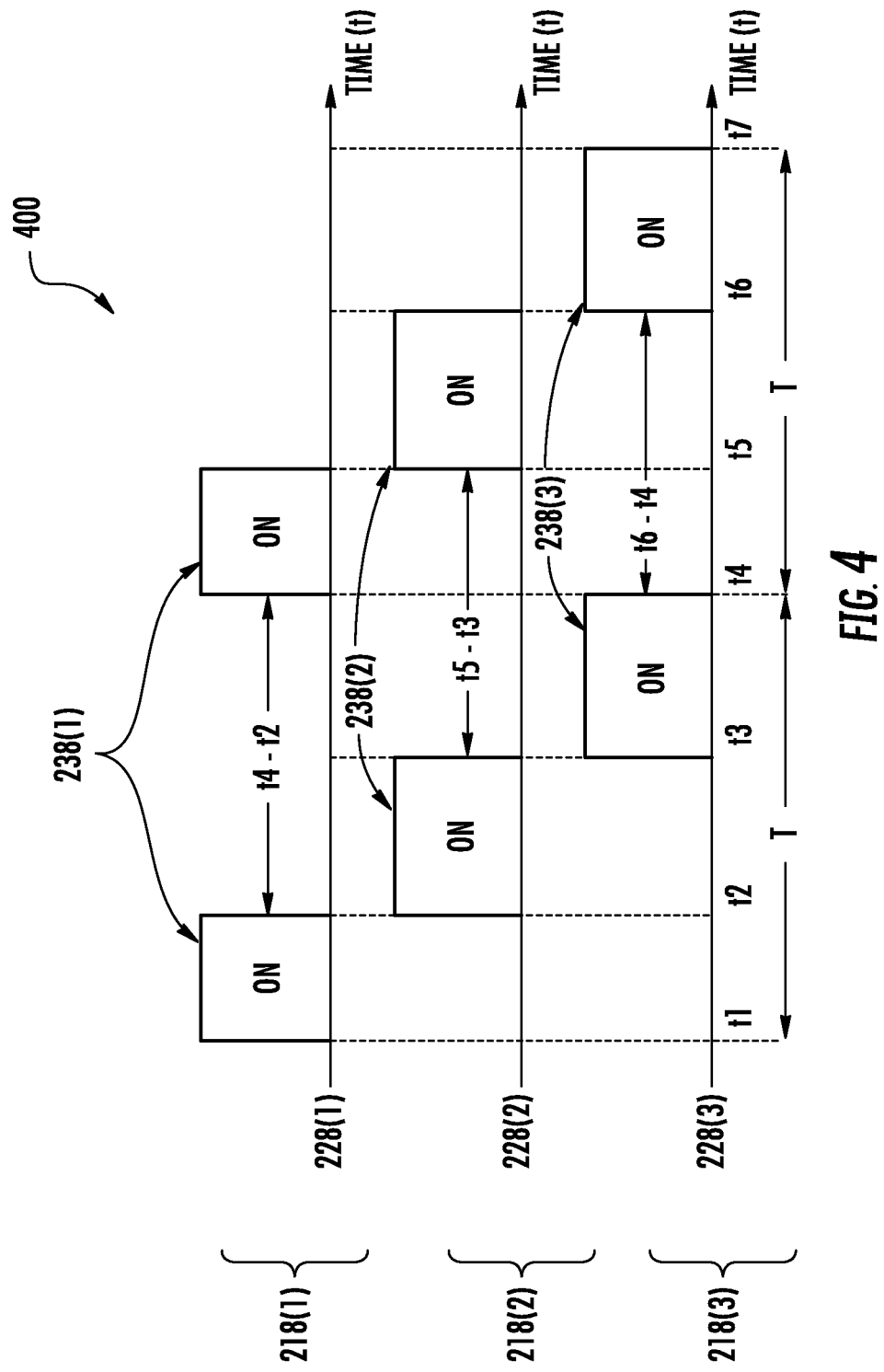
FIG. 4 is a timing diagram illustrating exemplary duty cycles of control circuits in each output power path in the remote unit in FIG. 2 controlling the portion of time that power received from a respective input power port is provided to a combined output power.

Thus, in this example, as shown in the timing diagram 400 in FIG. 4, the control circuits 234(1)-234(3) could be controlled to be turned on and turned off by the controller 236 to pulse width modulate (PWM) the electrically isolated output power 228(1)-228(3) in proportion to the power supplying capabilities of the respective power supplies 216(1)-216(3). As shown in FIG. 4, the three (3) electrically isolated output powers 228(1)-228(3) are pulse width modulated (PWM) by the controller 236 by controlling respective control circuits 234(1)-234(3). In this example, to PWM the electrically isolated output power 228(1)-228(3) in proportion to the power supplying capabilities of the respective power supplies 216(1)-216(3), the combined output power 222 at the combined power node 220 of the first electrically isolated output power 228(1) is PWM at 29.2% (i.e., 70 W/240 W). This is shown by time period t1 to t2 of period T in FIG. 4. The second electrically isolated output power 228(2) is PWM by the controller 236 at 33.3% (80 W/240 W). This is shown by time period t2 to t3 in period T in FIG. 4. The third electrically isolated output power 228(3) is PWM by the controller 236 at 37.5% (90 W/240 W) of time period T. This is shown by time period t3 to t4 in period T in FIG. 4.

In this regard, with reference to FIG. 2, the remote unit 200 additionally includes optional power measurement circuits 242(1)-242(Q) provided in each internal power path 218(1)-218(Q) to measure the power supplying capability of the power supplies 216(1)-216(Q) supplying power to the input power ports 208(1)-208(Q). In this manner, the relative power supplying capabilities of the power supplies 216(1)-216(Q) can be determined by the controller 236, to be able to proportionally control providing the electrically isolated output power 228(1)-228(Q) to the combined power node 220. The power measurement circuits 242(1)-242(Q) are provided between respective input power ports 208(1)-208(Q) and the isolation circuits 226(1)-226(Q) in the remote unit 200. The power measurement circuits 242(1)-242(Q) are configured to measure the available power provided to the input power ports 208(1)-208(Q) by the respective power supplies 216(1)-216(Q). The power measurement circuits 242(1)-242(Q) are further configured to provide the measured available power from the input power ports 208(1)-208(Q) to the controller 236.

In this regard, the controller 236 is configured to instruct the power measurement circuits 242(1)-242(Q) through control signals 244(1)-244(Q) to measure the available power that can be provided by the power supplies 216(1)-216(Q) to the respective input power ports 208(1)-208(Q). The power measurement circuits 242(1)-242(Q) may be configured to measure the maximum available power that can be provided by the power supplies 216(1)-216(Q) to the respective input power ports 208(1)-208(Q). As will be discussed in more detail below, the controller 236 can use the determined available power that can be provided by the power supplies 216(1)-216(Q) to selectively control the control circuits 234(1)-234(Q) to deliver the electrically isolated output power 228(1)-228(Q) to the combined power node 220 based on the available power that can be supplied by the respective power supplies 216(1)-216(Q). For example, the controller 236 may be configured to selectively control the control circuits 234(1)-234(Q) to proportionally deliver the electrically isolated output power 228(1)-228(Q) to the combined power node 220 based on the proportions of available power that can be supplied by the respective power supplies 216(1)-216(Q).

Figure 5:
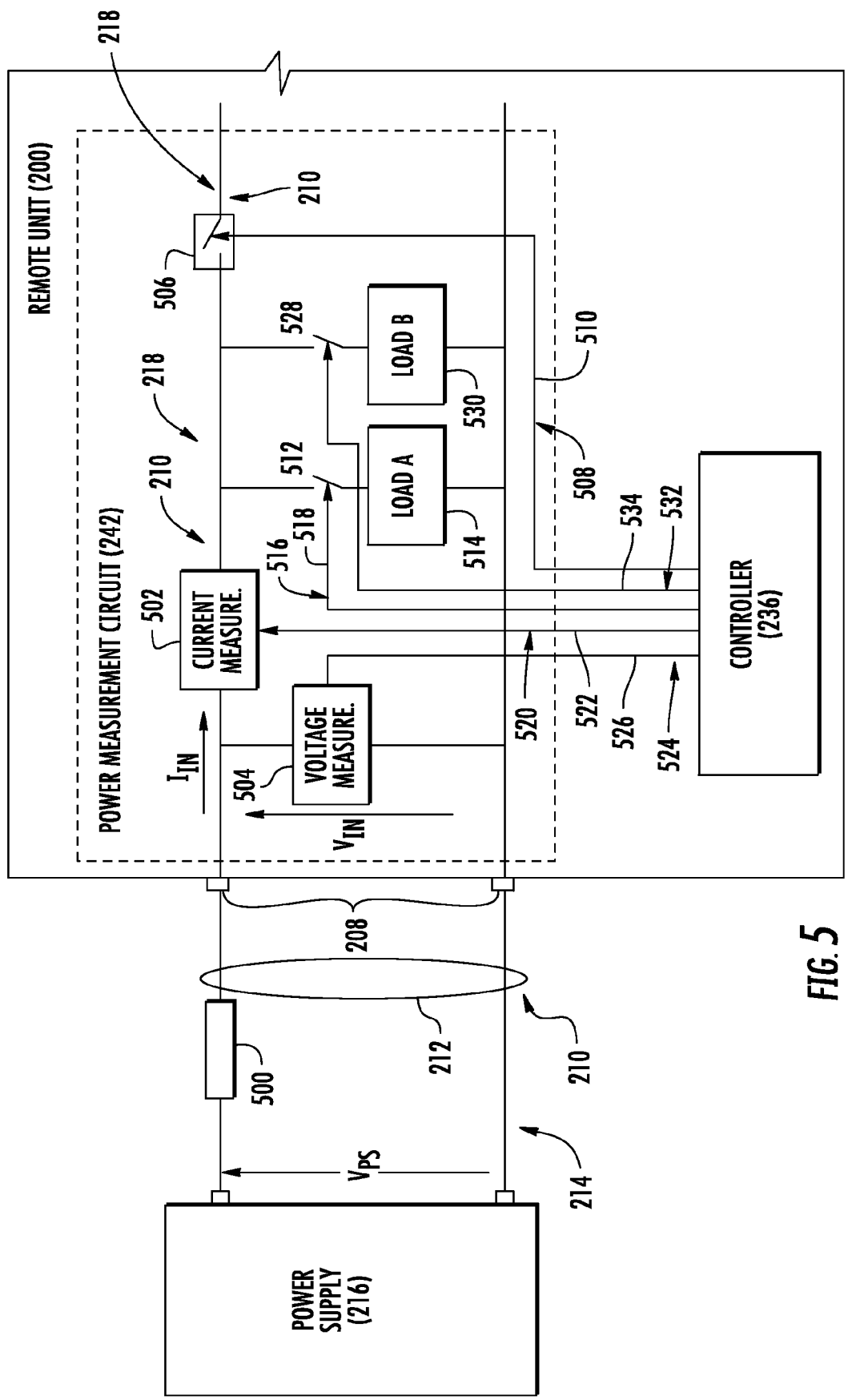
FIG. 5 is a schematic diagram illustrating more detail of an exemplary available power measurement circuit provided in the remote unit in FIG. 2 for measuring the available power from a power supply supplying power over an external power path to a respective input power port in the remote unit.

In this regard, FIG. 5 illustrates more exemplary detail of an exemplary power measurement circuit 242 provided in the remote unit 200 in FIG. 2. Only one power measurement circuit 242 is shown for one internal power path 218 in the remote unit 200 in FIG. 5 receiving the input power 210 from a corresponding power supply 216 for simplicity in illustration purposes only. However, it should be noted that a plurality of power measurement circuits 242(1)-242(Q)

can be provided corresponding to each internal power path 218(1)-218(Q), as illustrated in FIG. 2. The power measurement circuit 242 is configured to measure the available power from a power supply 216 supplying the input power 210 over the external power path 214 to a respective input power port 208. In one example, as discussed above, power measurement circuit 242 is configured to measure the maximum available power from a power supply 216 supplying the input power 210 over the external power path 214 to a respective input power port 208.

With continuing reference to FIG. 5, the power supply 216 is electrically connected through power wire pair 212 to the remote unit 200 to provide the input power 210 to the input power port 208. The power wire pair 212 has a resistance represented by resistor (R) 500. To measure the available power of the power supply 216, the input current $I_{IN}$ of the input power 210 is measured by a current measurement circuit 502 in the power measurement circuit 242 of the remote unit 200. The input voltage $V_{IN}$ of the input power 210 is measured by a voltage measurement circuit 504 in the power measurement circuit 242. In order to calculate the available input power 210 from the power supply 216, the controller 236 can be configured to manage the measurement of the input current $I_{IN}$ and the input voltage $V_{IN}$ in the following exemplary available power measurement process 600 in FIG. 6A discussed below.

Figure 6A:
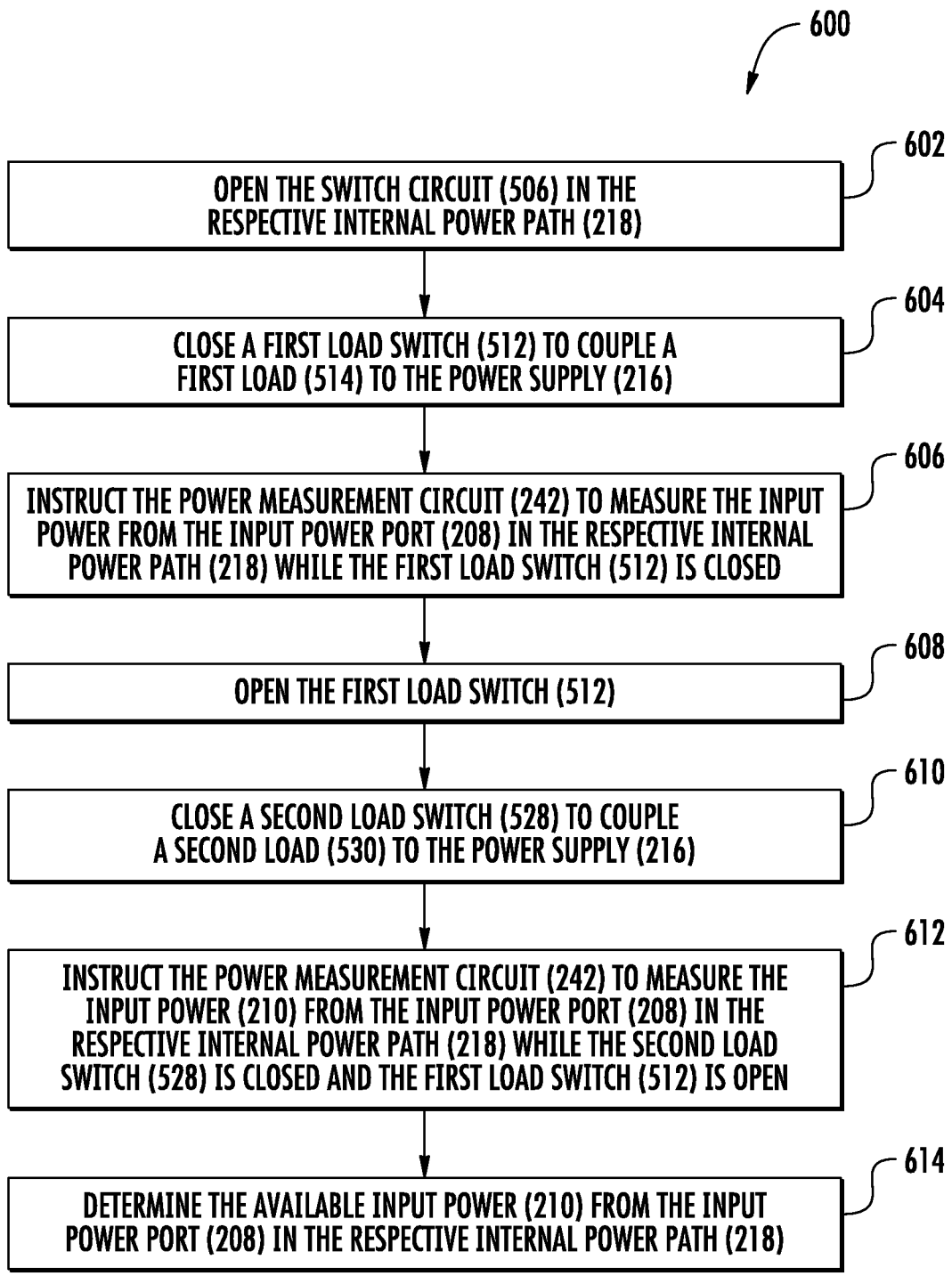
FIG. 6A is a flowchart illustrating an exemplary process of measuring the available power from a respective power supply supplying power over a respective external power path to a respective input power port in the remote unit.

With reference to FIG. 6A, the available power measurement process 600 begins with the controller 236 causing a switch circuit 506 in the respective internal power path 218 to temporarily disconnect the power measurement circuit 242 from any load, including a respective isolation circuit 226 and load 204 (see FIG. 2) (block 602). The controller 236 causes the switch circuit 506 to open by providing a switch control signal 508 on a switch control line 510 instructing the switch circuit 506 to open. Next, the controller 236 causes a first load switch 512 coupled to a first load (LOAD A) 514 to close to couple the first load 514 to the power supply 216 (block 604). The controller 236 causes the first load switch 512 to close by providing a switch control signal 516 on a switch control line 518 instructing the first load switch 512 to close. The controller 236 instructs the current measurement circuit 502 to measure the input power 210 on the input power port 208 with the first load 514 coupled to the power supply 216 by the first load switch 512 being closed (block 606). In this regard, the controller 236 provides a current measurement signal 520 on a current measurement line 522 to cause the current measurement circuit 502 to measure the input current $I_{IN}$ while the first load 514 is coupled to the power supply 216. The controller 236 also provides a voltage measurement signal 524 on a voltage measurement line 526 to cause the voltage measurement circuit 504 to measure the input voltage $V_{IN}$ while the first load 514 is coupled to the power supply 216.

With continuing reference to FIG. 6A, the controller 236 causes a switch control signal 516 on a switch control line 518 to instruct the first load switch 512 to open (block 608). Next, the controller 236 causes a second load switch 528 coupled to a second load (LOAD B) 530 to close to couple the second load 530 to the power supply 216 (block 610). The controller 236 causes the second load switch 528 to close by providing a switch control signal 532 on a switch control line 534 instructing the second load switch 528 to close. The controller 236 instructs the current measurement circuit 502 to measure the input power 210 on the input power port 208 with the second load 530 coupled to the power supply 216 by the second load switch 528 being closed (block 612). In this regard, the controller 236 provides the current measurement signal 520 on the current measurement line 522 to cause the current measurement circuit 502 to measure the input current $I_{IN}$ while the second load 530 is coupled to the power supply 216. The controller 236 also provides the voltage measurement signal 524 on the voltage measurement line 526 to cause the voltage measurement circuit 504 to measure the input voltage $V_{IN}$ while the second load 530 is coupled to the power supply 216. Based on the measured input current $I_{IN}$ and input voltage $V_{IN}$ for both the first load 514 and the second load 530 being coupled to the power supply 216, the following equations are created that can be solved for maximum available power from the power supply 216 (block 614):

$$V_{PS} = I_{IN\text{-}LOAD\ A} * R_{LINE} + V_{IN\text{-}LOAD\ A}, \text{ for first load 514 (LOAD } A\text{)} \quad (1)$$

$$V_{PS} = I_{IN\text{-}LOAD\ B} * R_{LINE} + V_{IN\text{-}LOAD\ B}, \text{ for second load 530 (LOAD } B\text{)} \quad (2)$$

Once the output voltage ($V_{PS}$) of power supply 216 and the resistance (R) of power wire pair 212 are known, the maximum input current $I_{IN[Max]}$ can be calculated by solving equations 1 and 2 above as:

$$I_{IN[Max]} = P_{O[MAX]}/V_{PS}, \quad (3)$$

where $P_{O\ [MAX]}$ is the maximum power allowed to be delivered by the power supply 216.

Then, the maximum input voltage $V_{IN}$ when the input power port 208 reaches the maximum input current $I_{IN[Max]}$ is calculated as:

$$V_{IN\ [@PS\text{-}MAX]} = V_{PS} - I_{IN\ [Max]} * R_{LINE} \quad (4)$$

Thus, the maximum available power $P_{IN\ [MAX]}$ that can be provided by the power supply 216 can be calculated as:

$$P_{IN\ [Max]} = I_{IN\ [@PS\text{-}MAX]} * V_{IN\ [@PS\text{-}MAX]}$$

Thus, using the PWM example above, the duty cycle of each control circuit 234(1)-234(Q) in the remote unit 200 in FIG. 2 is defined as the ratio between on time and the period time T (see FIG. 4). The duty cycle ($DC_I$) of each control circuit 234(1)-234(Q) can be calculated as:

$$DC_I = P_{IN\text{-}Q[Max]}/(P_{IN\ LOAD\ A[Max]} + P_{in\ LOAD\ B[Max]} + \ldots P_{IN\text{-}n[MAX]}) = P_{IN\text{-}Q[Max]}/P_{T\ Max},$$

where 'Q' is the number of internal power paths 218(1)-218(Q).

Thus, using the previous PWM example of three (3) power supplies 216(1)-216(3) discussed above with reference to FIG. 4, the duty cycle of each control circuit 234(1)-234(3) will be:

Duty cycle of control circuit 234(1): 70 W/240 W=0.2917.

Duty cycle of control circuit 234(2): 80 W/240 W=0.3333.

Duty cycle of control circuit 234(3): 90 W/240 W=0.3750.

It should be noted that for applications where the targeted power consumption from each of the power wire pairs 212(1)-212(Q) is based on a pre-defined balancing policy (i.e. different power consumption is requested), solving the above two equations (1) and (2) to get both the output voltage $V_{PS}$ and $R_{LINE}$ values is performed. The calculated output voltage $V_{PS}$ will be used in conjunction with the measured input current $I_{IN}$ to calculate the power consumption from the power supplies 216(1)-216(Q). The controller 236 can adjust the power consumption from each of the power wire pairs 212(1)-212(Q) to reach the targeted power consumption for the power supplies 216(1)-216(Q). There are two exemplary cases for determining the targeted power consumption for the power supplies 216(1)-216(Q):

in the case that the targeted power consumption includes the line power drop, the targeted power consumption is $P_{PS}=I_{IN}*V_{PS}$ for each power supply 216(1)-216(Q); and in the case that the targeted power consumption excludes the line power drop, the targeted power consumption is $P_{IN}=I_{IN}*V_{IN}$ for each power supply 216(1)-216(Q).

A given control circuit 234 in the remote unit 200 in FIG. 2 may be open at exactly the same time that the other control circuits 234 are closed. However, a short delay may be inserted between the on states of the control circuit 234(1)-234(Q) for avoiding a situation where two control circuits 234 are on at the same time.

When a given control circuit 234 delivers power $P_{ON}$ to the load 204 in a duty cycle (DC) portion of the time, the average power consumed at the input power ports 208(1)-208(Q) of a respective internal power path 218(1)-218(Q) is given by:

$$P_{Average} = P_{ON} \times DC_Q \tag{5}$$

In the maximal case, the average power $P_{Average[Max]}$ that can be consumed at the input power ports 208(1)-208(Q) of the respective internal power paths 218(1)-218(Q) is limited to $P_{IN-Q[Max]}$ that was calculated previously:

$$P_{Average[Max]} = P_{IN-Q[Max]} \tag{6}$$

Substituting equation 5 into equation 6 provides:

$$P_{Average[Max]} = P_{IN-Q[Max]} = P_{ON} \times DC_Q \tag{7}$$

And therefore, the maximum power that may be delivered to the load 204 in the remote unit 200 in each on time is given by:

$$P_{ON[Max]} = P_{IN-Q[Max]} / DC_Q \tag{8}$$

Since duty cycle ($DC_Q$) is defined as:

$$DC_Q = P_{IN-Q[Max]} / P_{T[Max]} \tag{9}$$

Then, by substituting equation 9 into equation 8, the maximum power that may be delivered by the power supply 216(1)-216(Q) for the load 204 in each on time is found to be:

$$\begin{aligned} P_{ON[Max]} &= P_{IN-Q[Max]} / DC_Q = \\ &P_{IN-Q[Max]} / P_{IN-Q[Max]} / P_{T[Max]} = P_{T[Max]} \end{aligned} \tag{10}$$

When the load 204 requires exactly the maximum available power $P_{T[Max]}$, which is $P_{T[Max]}=240$ W in the previous example, then at each on time of each control circuit 234(1)-234(Q), the input power 210 that will be delivered to the load 204 will be $P_{ON[Max]}=P_{T[Max]}=240$ W. Input power port 208(1) will deliver average power of 70 W and a peak power of 240 W. Input power port 208(2) will deliver average power of 80 W and a peak power of 240 W. Input power port 208(3) will deliver average power of 90 W and a peak power of 240 W. The capacitor circuits 240(1)-240(Q) in each internal power path 218(1)-218(Q) can be used for averaging the power bursts that are sourced by the load 204 from each internal power path 218(1)-218(Q). During the off period, the capacitor circuits 240(1)-240(Q) are charged with energy (through the isolation circuits 226(1)-226(Q) of each internal power path 218(1)-218(Q)). During off times, the capacitor circuits 240(1)-240(Q) provide energy to the load 204 in addition to the input power 210(1)-210(Q) provided to the input power ports 208(1)-208(Q). Then, when the consumed power by the remote unit 200 is lower than the maximum available power $P_{T[Max]}$, the input power 210(1)-210(Q) consumed from each input power port 208(1)-208(Q) will be proportionally lower than the maximum power that is allowed to be consumed through the internal power paths 218(1)-218(Q).

With reference back to FIG. 4, period time T can be determined according to the following considerations. When capacitor circuits 240(1)-240(Q) supplement the energy when the respective control circuit 234(1)-234(Q) is on (i.e., connected to the load 204), for on time $t_{ON}$, the voltage on the load 204 (FIG. 2) drops gradually. Assuming that a voltage drop of $\Delta V$ is allowed during on time $t_{ON}$, also assume a current of $I_C$ is consumed by the capacitor circuits 240(1)-240(Q) during discharge. The above mentioned parameters are related according to the well-known equation:

$$\Delta V = \frac{I_C \cdot t_{on}}{C} \tag{11}$$

where 'C' is the capacitance of a respective capacitor circuit 240(1)-240(Q).

Assuming that three (3) internal power paths 218(1)-218(3) are provided, and therefore $t_{ON}$ is approximately T/3, and assuming that a drop of $\Delta V$ is allowed when the control circuit 234 provides ⅔ of the load current $I_L$ during on time $t_{ON}$. Then, based on the above, the last equation may be re-written as:

$$\Delta V = \frac{I_L(2/3) \cdot (T/3)}{C} \tag{12}$$

$$T = \frac{\Delta V \cdot C \cdot 9}{2 \cdot I_L} \tag{13}$$

Now, assume that a capacitor circuit of 100 µF is used and voltage drop of $\Delta V=0.05$ Volts is allowed when the control circuit 234 provides ⅔ of the load current $I_L$ during on time $t_{ON}$, and assume that the maximum load current is $I_L=5$ A. Substituting the above assumptions to equation 13 will provide the period duration T.

$$T = \frac{\Delta V \cdot C \cdot 9}{2 \cdot I_L} = \frac{0.05 \cdot 100 \cdot 10^{-6} \cdot 9}{2 \cdot 5} = 4.5 \text{ µSec}$$

In addition to the above analysis, the voltage of electrically isolated output power 228(1)-228(Q) as well as the resistance of the components on the output side of the respective internal power path 218(1)-218(Q) of the isolation circuits 226(1)-226(Q) may suffer from tolerance/variation due to limited component accuracy. In order to mitigate this variation, a monitoring process 620 in FIG. 6B may be employed to determine the duty cycle (DC) of the control circuit 234(1)-234(Q) to compensate for the inefficiencies in the isolation circuits 226(1)-226(Q). In this regard, after the remote unit 200 is powered on, the controller 236 uses the first load switch 512 to connect a minimum load, such as the first load 514, to a respective internal power path 218(1)-218(Q) and sets a default or uniform duty cycle of all control circuits 234(1)-234(Q) (block 622). The controller 236 then performs the available power supplying capability of the power supplies 216(1)-216(Q) according to the example above, and reduces the results to fit the available power to the efficiency of the isolation circuits 226(1)-226(Q) (block 624). Next, the controller 236 executes an initial determination of the duty cycle of each control circuit 234(1)-234 (Q) as previously discussed (block 626). The controller 236 then instructs the power measurement circuits 242(1)-242 (Q) to perform current and voltage measurements in each internal power path 218(1)-218(Q), as previously discussed (block 628).

Figure 6B:
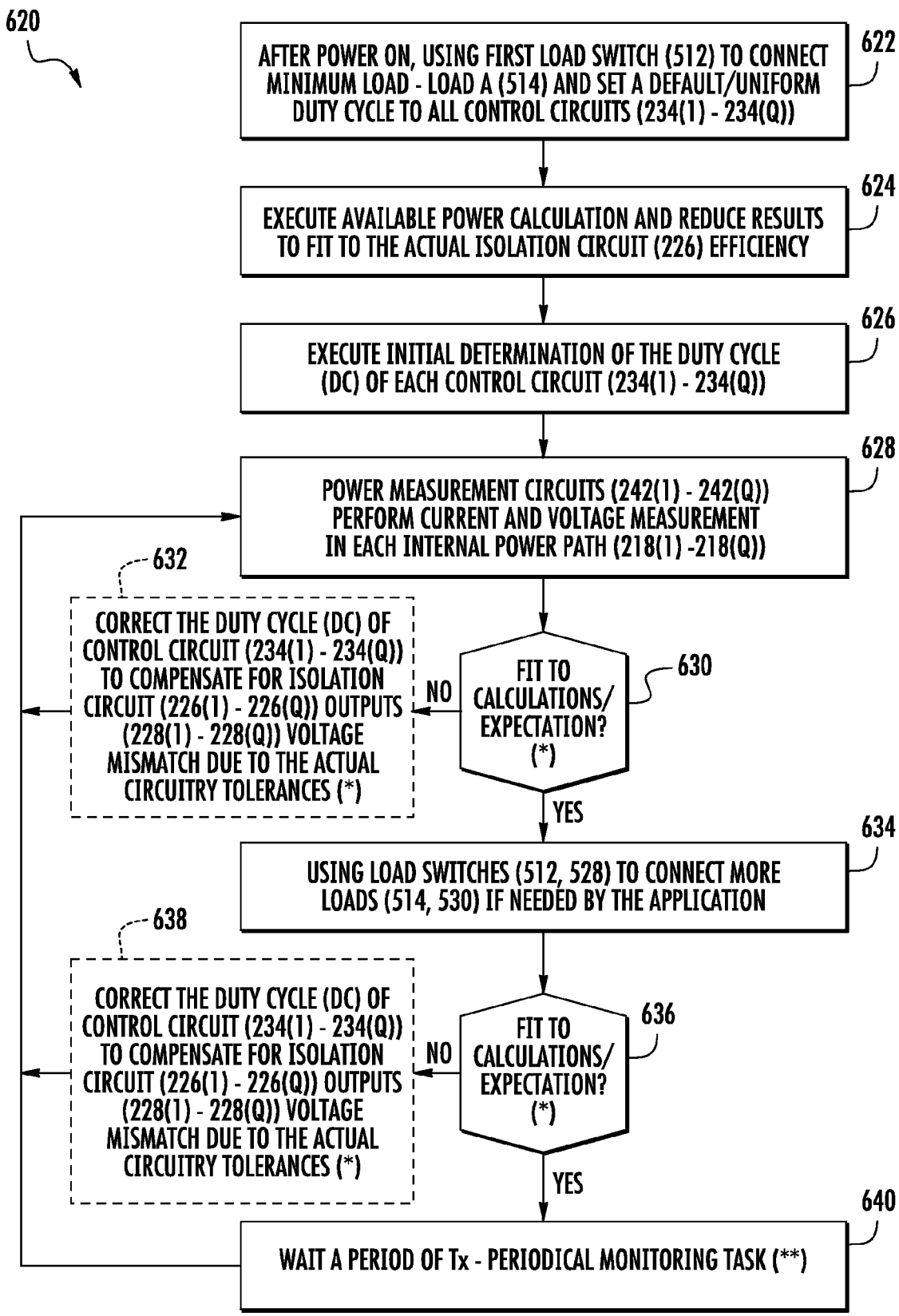
FIG. 6B is a flowchart illustrating an exemplary monitoring process of the remote unit in FIG. 2 determining isolation circuit intolerances to perform a correction process to compensate the output power for any such intolerances.

With continuing reference to FIG. 6B, the controller 236 determines if the fit to power measurement calculations meet expectations for the isolation circuits 226(1)-226(Q) (block 630). If not, the controller 236 may optionally correct the duty cycle of the control circuits 234(1)-234(Q) to compensate for the isolation circuits 226(1)-226(Q) voltage mismatches on the electrically isolated output powers 228(1)-228(Q) due to the actual circuitry intolerances (block 632). If controller 236 determines that the fit to power measurement calculations meet expectations for the isolation circuits 226(1)-226(Q), the controller 236 controls the first and second load switches 512, 528 to connect the first and second loads 514, 530 (or other loads) to the respective internal power paths 218(1)-218(Q), as previously discussed (block 634). The controller 236 then determines if the fit to power measurement calculations were to expectations for the isolation circuits 226(1)-226(Q) with the first and second loads 514, 530 connected (block 636). If not, the controller 236 again optionally corrects the duty cycle of the control circuits 234(1)-234(Q) to compensate for the isolation circuits 226(1)-226(Q) voltage mismatches on the electrically isolated output powers 228(1)-228(Q) due to the actual circuitry intolerances (block 638). If controller 236 determines that the fit to power measurement calculations meet expectations for the isolation circuits 226(1)-226(Q), the controller 236 waits a period of time (Tx) to repeat the monitoring process by retuning to block 708 (block 640).

Figure 7:
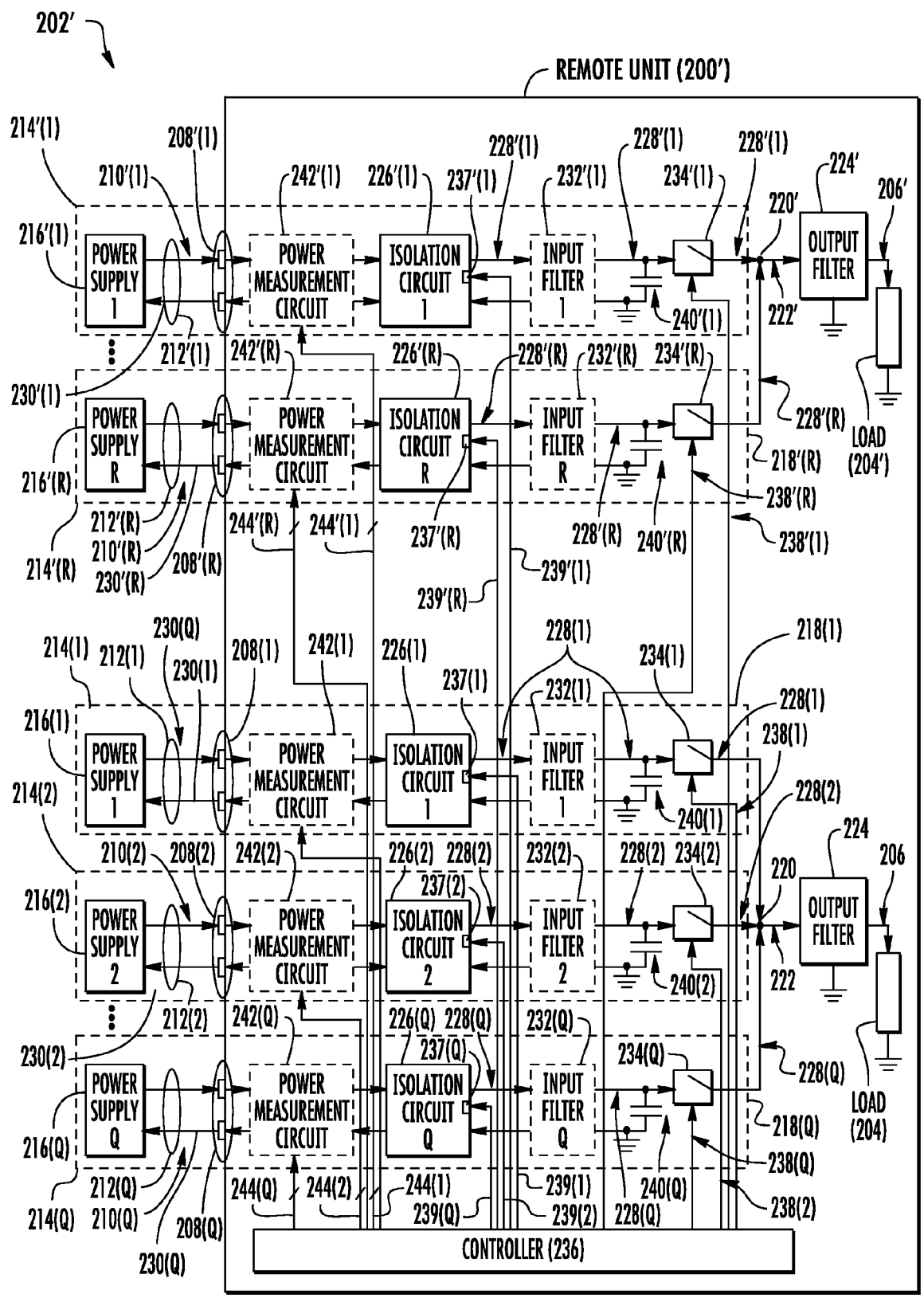
FIG. 7 is a schematic diagram of another exemplary remote unit that can be provided in a DAS, wherein the remote unit is configured to combine received power from electrically isolated power ports each receiving power from respective external power paths, to multiple output loads for powering the remote unit.

It is also possible to provide a remote unit that can be provided in a DAS, similar to the schematic diagram of FIG. 2 showing an exemplary remote unit 200 that can be provided in a DAS for combining power from isolated power paths for powering multiple loads in the remote units in distributed antenna systems (DASs). In this regard, FIG. 7 is a schematic diagram of another exemplary remote unit 200' that can be provided in the DAS 202', wherein the remote unit 200' is configured to combine received power from electrically isolated power ports each receiving power from respective external power paths, to multiple output loads for powering the remote unit 200'. The remote unit 200' is similar to the remote unit 200 in FIG. 2 in that the load 204 is included to receive an output power 206 based on received power from the power supplies 216(1)-216(Q) over internal power paths 218(1)-218(Q) that coupled to the combined power node 220 to provide a combined output power 222 for powering the load 204. In this regard, common elements between the remote unit 200 in FIG. 2 and the remote unit 200' in FIG. 7 are shown with common element numbers in FIGS. 2 and 7, and thus are not necessary to re-describe. However, the remote unit 200' also includes additional input power ports 208'(1)-208'(R) configured to receive power from power supplies 214'(1)-214' (R) to be electrically isolated and combined for providing power to an additional load 204'.

In this regard, the remote unit 200' in FIG. 7 contains multiple second input power ports 208'(1)-208'(R). 'R' signifies that any number of input power ports 208' desired can be provided in the remote unit 200'. Each second input power port 208'(1)-208'(R) is configured to receive second input power 210'(1)-210'(R) from a respective second power wire pair 212'(1)-212'(R) from a respective second external power path 214'(1)-214'(R) in the DAS 202'. The multiple second power supplies 216'(1)-216'(R) are provided in the DAS 202' to supply the second input power 210'(1)-210'(R) over the respective second power wire pairs 212'(1)-212'(R) in the second external power path 214'(1)-214'(R) to the remote unit 200'. The second power supplies 216'(1)-216'(R) may be located at the remote unit 200' or remotely from the remote unit 200'. Each second external power path 214'(1)-214'(R) is capable of distributing a given second maximum input power 210'(1)-210'(R) based on the respective second power supply 216'(1)-216'(R) and the power handling capability of the respective second power wire pair 212'(1)-212' (R). In this manner, the remote unit 200' is configured to receive the second input power 210'(1)-210'(R) from the multiple second power supplies 216'(1)-216'(R) in case the power needed to power the second, additional load 204' is greater than can be supplied by a single second power supply 216' among the multiple second power supplies 216'(1)-216' (R). For example, there may be restrictions on the maximum power that can be supplied by a power supply over a second power wire pair 212' to the remote unit 200'.

With continuing reference to FIG. 7, the remote unit 200' includes a plurality of second internal power paths 218'(1)-218'(R) for routing the received second input power 210' (1)-210'(R) from the second input power ports 208'(1)-208' (R) to the second load 204'. Each of the second internal power paths 218'(1)-218'(R) are coupled to a second combined power node 220' to provide a second combined output power 222' for powering the second load 204'. In the remote unit 200' in FIG., a second output filter 224' is provided to filter the second combined output power 222' into the second output power 206' provided to the second load 204'.

To avoid differences in the received second input power 210'(1)-210'(R) on the multiple second input power ports 208'(1)-208'(R) causing a second power supply 216'(1)-216' (R) from providing higher power than designed or regulated, the second input power ports 208'(1)-208'(R) in the remote unit 200' are electrically isolated from each other. In this regard, a plurality of second isolation circuits 226'(1)-226' (R) are provided in respective internal power paths 218'(1)-218'(R). For example, the second isolation circuits 226'(1)-226'(R) may be direct current (DC) to DC (DC-DC) converters if the second input power 210'(1)-210'(R) is DC input power to provide the second output power 206' as electrically isolated DC output power. As another example, second isolation circuits 226'(1)-226'(R) may be alternating current (AC) to DC (AC-DC) converters if the second input power 210'(1)-210'(R) is AC input power to provide the second output power 206' as electrically isolated DC output power. Each second isolation circuit 226'(1)-226'(R) is configured to receive the respective second input power 210' (1)-210'(R) from the respective second input power port 208'(1)-208'(R). Each second isolation circuit 226'(1)-226' (R) is further configured to provide a respective second electrically isolated output power 228'(1)-228'(R) to the second combined power node 220'. The second electrically isolated output powers 228'(1)-228'(R) received at the second combined power node 220' are combined together to form the second combined output power 222'. The second isolation circuits 226'(1)-226'(R) are capable of providing stable second electrically isolated output powers 228'(1)-228'(R) to provide a stable second combined output power 222'. Also, by providing the second isolation circuits 226' (1)-226'(R) in the respective second internal power paths 218'(1)-218'(R), the second input power 210'(1)-210'(R) being higher from one or more second power supplies 216'(1)-216'(R) than other second power supplies 216'(1)-216'(R) on the second return paths 230'(1)-230'(R) of the respective second power wire pairs 212'(1)-212'(R) does not cause a greater amount of power to be pulled beyond the power supply capability limits of a respective second power supply 216'(1)-216'(R). Optional second input filters 232' (1)-232'(R) can be provided in respective second internal power paths 218'(1)-218'(R) to filter the second electrically isolated output powers 228'(1)-228'(R) before being provided to the second combined power node 220'.

The second load 204' may not require the maximum amount of power that can be provided in the second output power 206' from the contribution of the second electrically isolated output powers 228'(1)-228'(R) from the second isolation circuits 226'(1)-226'(R) to the second combined power node 220'. In this regard, a plurality of second control circuits 234'(1)-234'(R) can be provided in each second internal power path 218'(1)-218'(R), respectively. For example, the second control circuits 234'(1)-234'(R) may be switching circuits in the form of switches. An electronic controller 236 ("controller 236") is provided in the remote unit 200' that is configured to control operation of the second control circuits 234'(1)-234'(R) to control the amount of the second electrically isolated output power 228'(1)-228'(R) to be delivered and combined at the second combined power node 220' in the second combined output power 222'. As non-limiting examples, the controller 236 may be a microcontroller, microprocessor, logic circuit, or other control circuit. In this regard, the controller 236 can selectively control the second control circuits 234'(1)-234'(R) to couple the second electrically isolated output power 228'(1)-228'(R) to the second combined power node 220' or decouple the second electrically isolated output power 228'(1)-228'(R) from the second combined power node 220'. To selectively control the second control circuits 234'(1)-234'(R), the controller 236 is configured to provide a second control signal 238'(1)-238'(R) to each of the respective second control circuits 234'(1)-234'(R) to control the control circuits 234' (1)-234'(R). As an example, the controller 236 can selectively control the control circuits 234'(1)-234'(R) to provide different levels of second combined output power 222' to the second load 204' depending on the power needed by the second load 204' for operation. The remote unit 200' may also be designed to only need to power certain portions of the second load 204' based on operation of the remote unit 200'.

Second capacitor circuits 240'(1)-240'(R) may be provided in each of the respective second internal power paths 218'(1)-218'(R) between the second isolation circuits 226' (1)-226'(R) and the second control circuits 234'(1)-234'(R) to store energy from the second electrically isolated output power 228'(1)-228'(R) to smooth out or average any power bursts of the second electrically isolated output power 228'(1)-228'(R). The second capacitor circuits 240'(1)-240' (R) may each be comprised of a single capacitor or network of capacitors.

Note that the second isolation circuits 226'(1)-226'(R) may have a second adjustable output power input 237'(1)- 237'(R), in the form of a current limiter input or adjustable output voltage that can be set by the controller 236 according to second adjustment signals 239'(1)-239'(R). The second adjustment signals 239'(1)-239'(R) may be either analog or digital signals depending on the type of second isolation circuits 226'(1)-226'(R) employed. Using these current limiters or output voltage adjustment mechanisms, it is possible to limit the second electrically isolated output power 228' (1)-228'(R) delivered through each second internal power path 218'(1)-218'(R) to the maximum allowed second combined output power 222'. In case of voltage based adjustment mechanism for the second isolation circuits 226'(1)-226'(R), the current of the second electrically isolated output power 228'(1)-228'(R) of a specific second isolation circuit 226' will increase or decrease depending on the voltage difference between the second electrically isolated output power 228'(1)-228'(R) of the specific second isolation circuit 226' and the second combined power node 220', divided by the resistance of the electrical path between these nodes. The series resistance includes both the respective second input filter 232' and the control circuit 234' resistance. In case the resistance between a second isolation circuit 226'(1)-226'(R) and the second combined power node 220' is too low, an additional series resistor (not shown) may be added to the output of the second isolation circuits 226'(1)-226'(R), to enable fine tuning of the output current or voltage of the second electrically isolated output power 228'(1)-228'(R).

Note that each of the processes disclosed herein, including those discussed as being performed by the controller 236, can be performed for the second internal power paths 218'(1)-218'(R) to provide the second combined output power 222' to the second load 204'.

Figure 8:
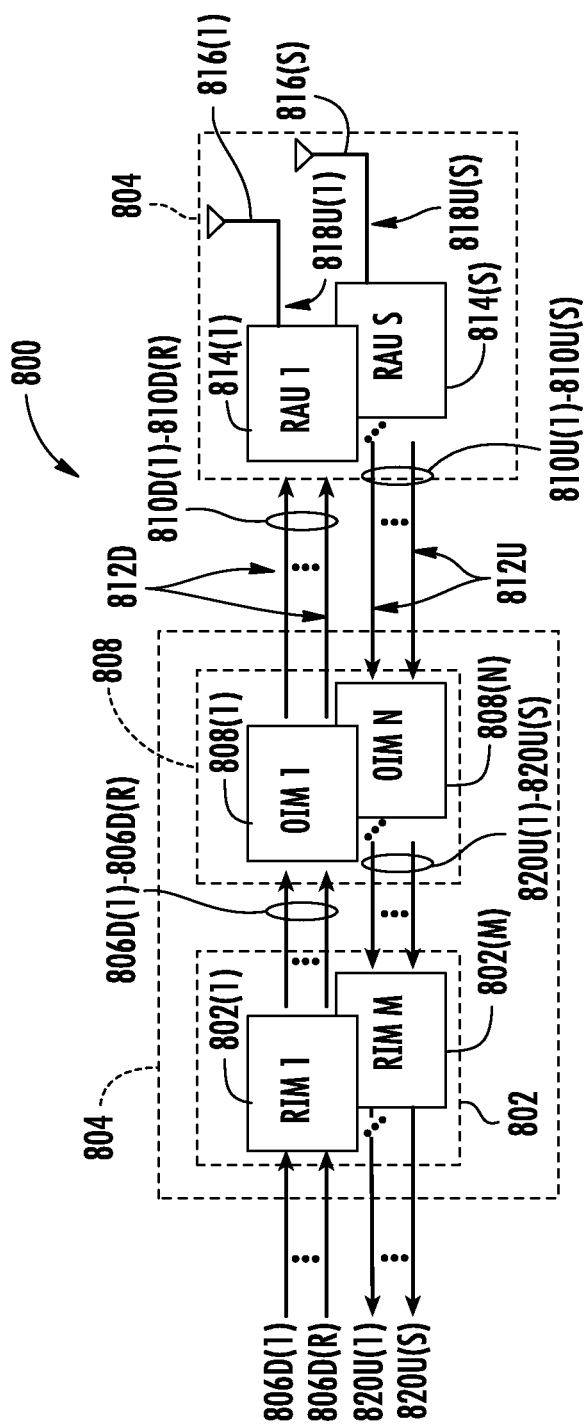
FIG. 8 is a schematic diagram of an exemplary DAS employing one or more remote units configured to combine received power from electrically isolated power ports each receiving power from respective power paths, for powering the remote unit.

FIG. 8 is a schematic diagram of an exemplary DAS 800 that can include remote units configured to combine received power from electrically isolated power ports each receiving power from respective power paths, for powering the remote unit. In this example, the DAS 800 is an optical fiber-based DAS. The DAS 800 includes optical fiber for distributing communications services for multiple frequency bands. The DAS 800 in this example is comprised of three (3) main components. One or more radio interfaces provided in the form of radio interface modules (RIMs) 802(1)-802 (M) are provided in a central unit 804 to receive and process downlink electrical communications signals 806D(1)-806D (R) prior to optical conversion into downlink optical communications signals. The downlink electrical communications signals 806D(1)-806D(R) may be received from a base station (not shown) as an example. The RIMs 802(1)-802 (M) provide both downlink and uplink interfaces for signal processing. The notations "1-R" and "1-M" indicate that any number of the referenced component, 1-R and 1-M, respectively, may be provided. The central unit 804 is configured to accept the plurality of RIMs 802(1)-802(M) as modular components that can easily be installed and removed or replaced in the central unit 804. In one example, the central unit 804 is configured to support up to twelve (12) RIMs 802(1)-802(12). Each RIM 802(1)-802(M) can be designed to support a particular type of radio source or range of radio sources (i.e., frequencies) to provide flexibility in configuring the central unit 804 and the DAS 800 to support the desired radio sources.

For example, one RIM 802 may be configured to support the Personal Communication Services (PCS) radio band. Another RIM 802 may be configured to support the 800 MHz radio band. In this example, by inclusion of these RIMs 802, the central unit 804 could be configured to support and distribute communications signals on both PCS and LTE 700 radio bands, as an example. RIMs 802 may be provided in the central unit 804 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 802(1)-802(M) may also be provided in the central unit 804 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 802(1)-802(M) may be provided in the central unit 804 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-8699 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink electrical communications signals 806D(1)-806D(R) are provided to a plurality of optical interfaces provided in the form of optical interface modules (OIMs) 808(1)-808(N) in this embodiment to convert the downlink electrical communications signals 806D(1)-806D(R) into downlink optical communications signals 810D(1)-810D(R). The notation "1-N" indicates that any number of the referenced component 1-N may be provided. The OIMs 808 may be configured to provide one or more optical interface components (OICs) that contain optical to electrical (O/E) and electrical to optical (E/O) converters, as will be described in more detail below. The OIMs 808 support the radio bands that can be provided by the RIMs 802, including the examples previously described above.

The OIMs 808(1)-808(N) each include E/O converters to convert the downlink electrical communications signals 806D(1)-806D(R) into the downlink optical communications signals 810D(1)-810D(R). The downlink optical communications signals 810D(1)-810D(R) are communicated over downlink optical fiber communications medium 812D to a plurality of remote units 814(1)-814(S), which may be remote antenna units ("RAUs 814(1)-814(S)"). The notation "1-S" indicates that any number of the referenced component 1-S may be provided. O/E converters provided in the RAUs 814(1)-814(S) convert the downlink optical communications signals 810D(1)-810D(R) back into the downlink electrical communications signals 806D(1)-806D(R), which are provided to antennas 816(1)-816(S) in the RAUs 814(1)-814(S) to client devices (not shown) in the reception range of the antennas 816(1)-816(S).

E/O converters are also provided in the RAUs 814(1)-814(S) to convert uplink electrical communications signals 818U(1)-818U(S) received from client devices (not shown) through the antennas 816(1)-816(S) into uplink optical communications signals 810U(1)-810U(S). The RAUs 814(1)-814(S) communicate the uplink optical communications signals 810U(1)-810U(S) over an uplink optical fiber communications medium 812U to the OIMs 808(1)-808(N) in the central unit 804. The OIMs 808(1)-808(N) include O/E converters that convert the received uplink optical communications signals 810U(1)-810U(S) into uplink electrical communications signals 820U(1)-820U(S), which are processed by the RIMs 802(1)-802(M) and provided as uplink electrical communications signals 820U(1)-820U(S). The central unit 804 may provide the uplink electrical communications signals 820U(1)-820U(S) to a base station or other communications system.

Note that the downlink optical fiber communications medium 812D and uplink optical fiber communications medium 812U connected to each RAU 814(1)-814(S) may be a common optical fiber communications medium, wherein for example, wave division multiplexing (WDM) may be employed to provide the downlink optical communications signals 810D(1)-810D(R) and the uplink optical communications signals 810U(1)-810U(S) on the same optical fiber communications medium.

Figure 9:
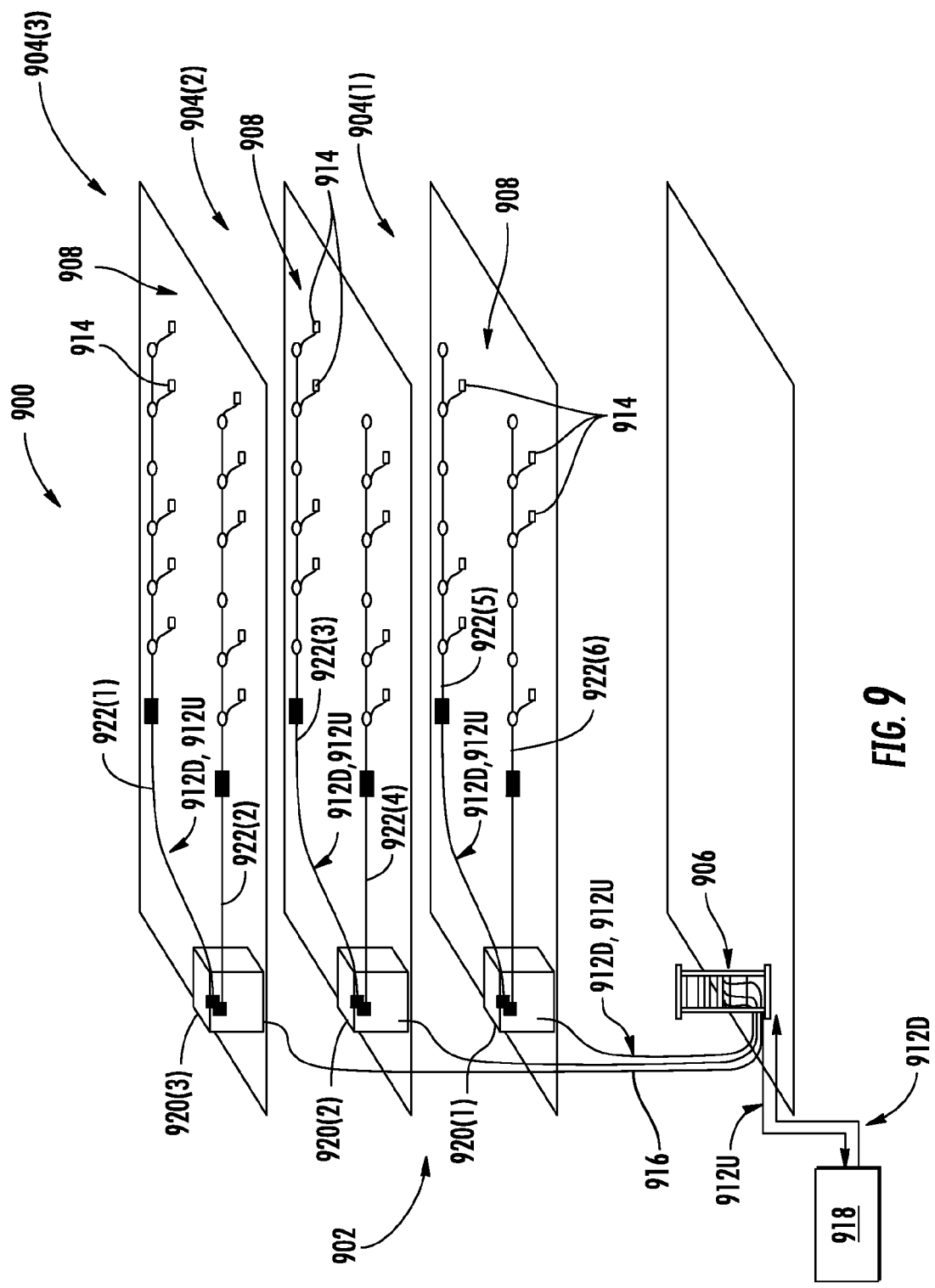
FIG. 9 is a partially schematic cut-away diagram of an exemplary building infrastructure in which a DAS can be employed, wherein one or more of the remote units is configured to combine received power from electrically isolated power ports each receiving power from respective external power paths, for powering the remote unit.

The DAS 800 in FIG. 8 that includes one or more RAUs 814 configured to combine received power from electrically isolated power ports each receiving power from respective power paths, for powering the remote unit, may be provided in an indoor environment. In this regard, FIG. 9 is a partially schematic cut-away diagram of a building infrastructure 900 employing a DAS 902 that includes one or more remote units configured to combine received power from electrically isolated power ports each receiving power from respective power paths, for powering the remote unit.

In this regard, the building infrastructure 900 in this example includes a first (ground) floor 904(1), a second floor 904(2), and a third floor 904(3). The floors 904(1)-904(3) are serviced by the central unit 906 to provide the antenna coverage areas 908 in the building infrastructure 900. The central unit 906 is communicatively coupled to the base station 910 to receive downlink communications signals 912D from the base station 910. The central unit 906 is communicatively coupled to remote antenna units 914 to receive uplink communications signals 912U from the remote antenna units 914. The remote antenna units 914 are configured to combine received power from electrically isolated power ports each receiving power from respective power paths, for powering the remote unit, including according to any of the exemplary examples discussed above. The downlink and uplink communications signals 912D, 912U communicated between the central unit 906 and the remote antenna units 914 are carried over a riser cable 916. The riser cable 916 may be routed through interconnect units (ICUs) 920(1)-920(3) dedicated to each floor 904(1)-904(3) that route the downlink and uplink communications signals 912D, 912U to the remote antenna units 914 and also provide power to the remote antenna units 914 via array cables 922(1)-922(6). The ICUs 920(1)-920(3) may contain power supplies that supply power over multiple power paths to the remote antenna units 914. Thus, the array cables 922(1)-922(6) may each include multiple power conductor pairs to provide multiple power paths for supplying power to the remote antenna units 914.

Figure 10:
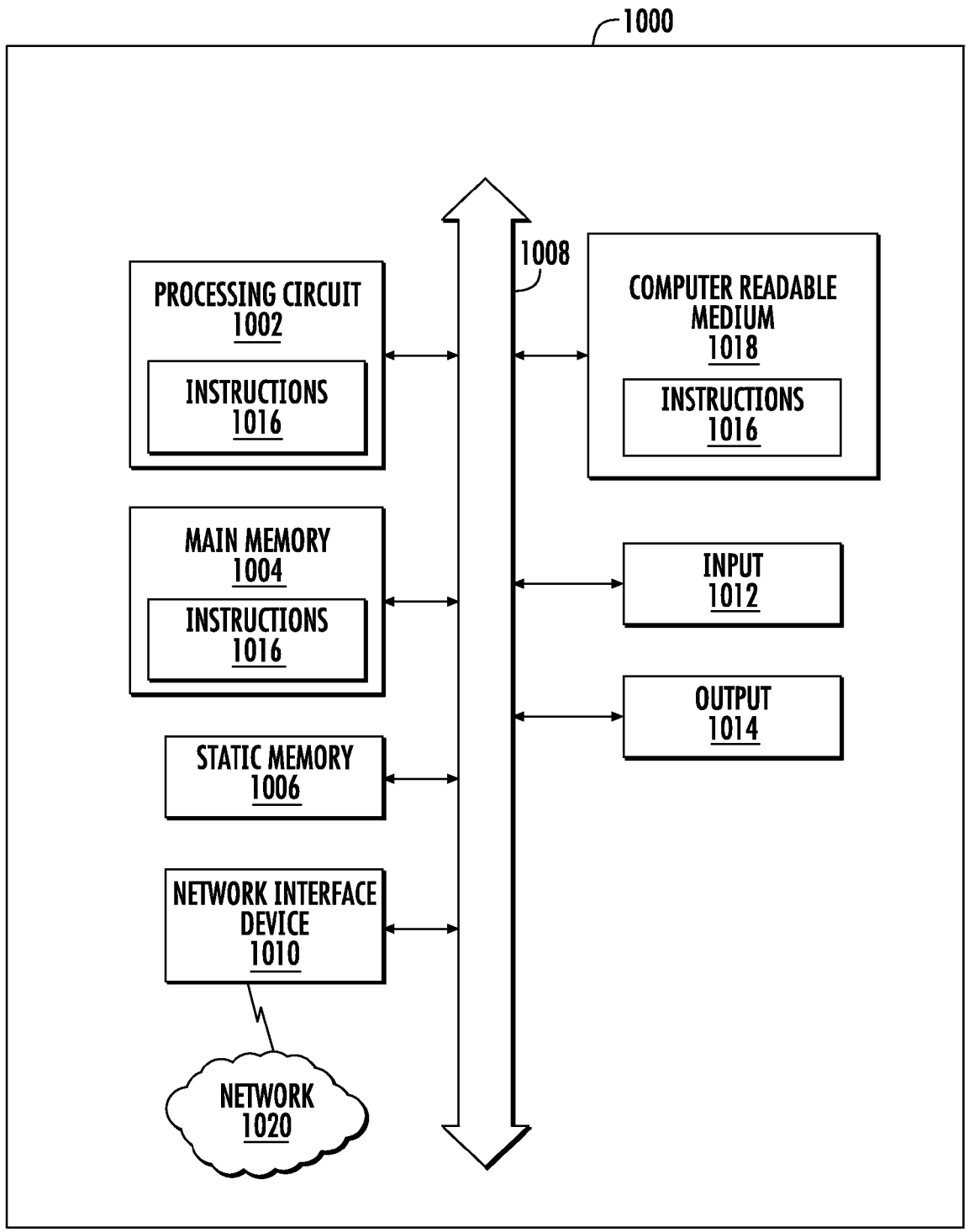
FIG. 10 is a schematic diagram of a generalized representation of an exemplary controller that can be included in a remote unit for measuring the available power from a power supply supplying power over a respective external power path to a respective input power port in the remote unit and/or proportionally controlling the contribution of power from each of the input power ports to the combined output power based on the measured available power from the respective power supplies, wherein the exemplary computer system is adapted to execute instructions from an exemplary computer readable medium.

FIG. 10 is a schematic diagram representation of additional detail illustrating a computer system 1000 that could be employed in the controllers discussed above, including but not limited to controller 236 in the remote unit 200 in FIG. 2. As discussed above, the controller 236 is configured to measure the available power from a power supply supplying power over a power path to a respective input power port in the remote unit 200, and proportionally control the contribution of power from each of the input power ports to the combined output power based on the measured available power from the respective power supplies. In this regard, the computer system 1000 is adapted to execute instructions from an exemplary computer-readable medium to perform these and/or any of the functions or processing described herein.

With reference to FIG. 10, the computer system 1000 may include a set of instructions that may be executed to predict frequency interference to avoid or reduce interference in a multi-frequency DAS. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing circuit ("processor 1002"), a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or static memory 1006 directly or via some other connectivity bus or connection. The processor 1002 may be a controller. The main memory 1004 and static memory 1006 may be any type of memory.

The processor 1002 may be a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit for a distributed antenna system (DAS), comprising:
   a plurality of internal power paths each configured to carry power to a combined power node coupled to at least one remote unit load to provide a combined output power to the at least one remote unit load;
   a plurality of input power ports provided in a respective internal power path among the plurality of internal power paths, each input power port among the plurality of input power ports configured to receive input power from a respective external power path in a DAS;
   a plurality of isolation circuits provided in a respective internal power path among the plurality of internal power paths, each isolation circuit among the plurality of isolation circuits configured to:
      receive the input power from the respective input power port; and
      provide an electrically isolated output power based on the received input power at the combined power node to provide the combined output power;
   a plurality of control circuits provided between the combined power node and the plurality of isolation circuits in a respective internal power path among the plurality of internal power paths to control the electrically isolated output power provided to the combined power node; and
   a controller configured to selectively control the plurality of control circuits to control the electrically isolated output power delivered from each isolation circuit in the respective internal power path, to the combined power node into the combined output power.

2. The remote unit of claim 1, further comprising:
   a plurality of power measurement circuits provided between the input power port and the isolation circuit in a respective internal power path among the plurality of internal power paths, each power measurement circuit among the plurality of power measurement circuits configured to:
      measure the available power from the input power port in the respective internal power path; and
      provide the measured available power from the input power port in the respective internal power path;
   the controller further configured to, for each respective internal power path among the plurality of internal power paths:
      instruct the power measurement circuit to measure the available power from the input power port;
      determine the measured available power from the input power port in the respective internal power path based on the available power measured by the plurality of power measurement circuits; and
      selectively control the plurality of control circuits to control the amount of electrically isolated output power delivered from each isolation circuit in the respective internal power path, to the combined power node into the combined output power, based on the measured available power from the input power port in the respective internal power path.

3. The remote unit of claim 2, wherein the controller is configured to selectively control the amount of electrically isolated output power based on a maximum measured available power from the input power port in the respective internal power path.

4. The remote unit of claim 2, wherein:
the plurality of control circuits comprises a plurality of switches provided between the combined power node and the plurality of isolation circuits in a respective internal power path among the plurality of internal power paths; and
the controller configured to selectively control the plurality of switches to control the amount of electrically isolated output power coupled from each isolation circuit in the respective internal power path to the combined power node.

5. The remote unit of claim 4, wherein the controller is configured to selectively control the plurality of switches to selectively pulse width modulate the electrically isolated output power from the isolation circuit in the respective internal power path, to the combined power node.

6. The remote unit of claim 4, further comprising a plurality of load switches provided between the combined power node and the isolation circuits in a respective internal power path among the plurality of internal power paths;
wherein the controller is further configured to, for each internal power path among the plurality of internal power paths:
open a switch circuit in the respective internal power path coupling the power measurement circuit to the respective isolation circuit to isolate the power measurement circuit from the respective isolation circuit;
close a first load switch among the plurality of load switches to couple a first load to the power supply;
instruct the power measurement circuit to measure the power from the input power port in the respective internal power path while the first load switch is closed;
open the first load switch;
close a second load switch among the plurality of load switches to couple a second load to the power supply;
instruct the power measurement circuit to measure the power from the input power port in the respective internal power path while the second load switch is closed; and
determine the available power from the input power port in the respective internal power path.

7. The remote unit of claim 2, wherein the controller is further configured to proportionally control the amount of electrically isolated output power delivered from each isolation circuit in the respective internal power path to the combined power node into the combined output power, based on the measured available power from the input power port in the respective internal power path.

8. The remote unit of claim 2, wherein each of the plurality of isolation circuits further comprises an output power adjustment input; and
the controller is configured to selectively adjust the amount of electrically isolated output power by being configured to provide an adjustment signal to each output power adjustment input of the plurality of isolation circuits to adjust the electrically isolated output power.

9. The remote unit of claim 2, wherein each of the plurality of isolation circuits further comprises an output power adjustment input; and
the controller is configured to selectively control the amount of electrically isolated output power by being configured to provide an adjustment signal to each output power adjustment input of the plurality of isolation circuits to adjust the electrically isolated output power.

10. The remote unit of claim 9, wherein the controller is configured to provide the adjustment signal to each output power adjustment input of the plurality of isolation circuits to adjust a voltage of electrically isolated output power.

11. The remote unit of claim 10, wherein the controller is configured to provide the adjustment signal to each output power adjustment input of the plurality of isolation circuits to adjust the voltage of electrically isolated output power, based on the voltage difference between the electrically isolated output power and the voltage of the combined power node.

12. The remote unit of claim 1, further comprising:
a plurality of switch circuits provided between the combined power node and the plurality of isolation circuits in a respective internal power path among the plurality of internal power paths; and
the controller configured to selectively control the amount of electrically isolated output power by being configured to selectively control the plurality of switch circuits to selectively couple the electrically isolated output power from the isolation circuit in the respective internal power path, to the combined power node.

13. The remote unit of claim 1, wherein each of the plurality of isolation circuits further comprises an output power adjustment input; and
the controller is configured to selectively control the amount of electrically isolated output power by being configured to provide an adjustment signal to each output power adjustment input of the plurality of isolation circuits to adjust the electrically isolated output power.

14. The remote unit of claim 1, wherein:
the plurality of internal power paths are each configured to carry the input power comprising direct current (DC) input power; and
the plurality of isolation circuits are comprised of a plurality of DC-DC converters configured to:
receive the DC input power from the respective input power port; and
provide the electrically isolated output power comprising electrically isolated DC output power based on the received DC input power, to the combined power node to provide the combined output power comprising combined DC power.

15. The remote unit of claim 1, wherein:
the plurality of internal power paths are each configured to carry the input power comprising alternating current (AC) input power; and
the plurality of isolation circuits are comprised of a plurality of AC-DC converters configured to:
receive the AC input power from the respective input power port; and
provide the electrically isolated output power comprising electrically isolated DC output power based on the received AC input power, to the combined power node to provide the combined output power comprising combined DC power.

16. The remote unit of claim 1, further comprising a plurality of input filters provided between the isolation circuit and the combined power node in a respective internal power path among the plurality of internal power paths, each filter among the plurality of filters configured to filter the electrically isolated output power.

17. The remote unit of claim 1, further comprising a plurality of capacitor circuits provided between the isolation circuit and the combined power node in a respective internal power path among the plurality of internal power paths, each capacitor circuit among the plurality of capacitor circuits configured to store energy from the electrically isolated output power from the respective isolation circuit to average power bursts of the electrically isolated output power.

18. The remote unit of claim 1, further comprising:
a plurality of second internal power paths each configured to carry power to a second combined power node coupled to at least one second remote unit load to provide a second combined output power to the at least one second remote unit load;
a plurality of second input power ports provided in a respective second internal power path among the plurality of second internal power paths, each second input power port among the plurality of second input power ports configured to receive second input power from a respective second external power path in a DAS;
a plurality of second isolation circuits provided in a respective second internal power path among the plurality of second internal power paths, each second isolation circuit among the plurality of second isolation circuits configured to:
receive the second input power from the respective second input power port; and
provide a second electrically isolated output power based on the received second input power at the second combined power node to provide the second combined output power;
a plurality of second control circuits provided between the second combined power node and the plurality of second isolation circuits in a respective second internal power path among the plurality of second internal power paths to control the second electrically isolated output power provided to the second combined power node; and
the controller configured to selectively control the plurality of second control circuits to control the second electrically isolated output power delivered from each second isolation circuit in the respective internal power path, to the second combined power node into the second combined output power.

19. A distributed antenna system (DAS), comprising:
a central unit configured to:
distribute at least one downlink communications signal over at least one communications medium to at least one remote unit among a plurality of remote units; and
receive at least one uplink communications signal over the at least one communications medium from at least one remote unit among the plurality of remote units;
each of the plurality of remote units configured to:
receive the at least one downlink communications signal over the at least one communications medium from the central unit; and
distribute the received at least one downlink communications signal from the central unit to at least one client device;
receive the at least one uplink communications signal from the at least one client device; and
distribute the received at least one uplink communications signal over the at least one communications medium to the central unit; and
at least one of the plurality of remote units further comprising:
a plurality of internal power paths each configured to carry power to a combined power node coupled to at least one remote unit load to provide a combined output power to the at least one remote unit load;
a plurality of input power ports provided in a respective internal power path among the plurality of internal power paths, each input power port among the plurality of input power ports configured to receive input power from a respective external power path in a DAS;
a plurality of isolation circuits provided in a respective internal power path among the plurality of internal power paths, each isolation circuit among the plurality of isolation circuits configured to:
receive the input power from a respective input power port; and
provide an electrically isolated output power based on the received input power at the combined power node to provide the combined output power;
a plurality of control circuits provided between the combined power node and the plurality of isolation circuits in a respective internal power path among the plurality of internal power paths; and
a controller configured to selectively control an amount of electrically isolated output power delivered from the isolation circuit in the respective internal power path, to the combined power node into the combined output power.

20. The DAS of claim 19, further comprising a plurality of power supplies, each power supply among the plurality of power supplies configured to supply the input power to a respective input power port amount the plurality of input power ports.

21. The DAS of claim 20, wherein the plurality of power supplies are provided remotely from the plurality of remote units.

22. The DAS of claim 20, wherein the plurality of power supplies are provided in one or more interconnect units (ICUs).

23. The DAS of claim 20, wherein the plurality of power supplies are provided in a head-end equipment housing in the central unit.

24. The DAS of claim 19, wherein the at least one remote unit further comprises:
a plurality of second internal power paths each configured to carry power to a second combined power node coupled to at least one second remote unit load to provide a second combined output power to the at least one second remote unit load;
a plurality of second input power ports provided in a respective second internal power path among the plurality of second internal power paths, each second input power port among the plurality of second input power ports configured to receive second input power from a respective second external power path in a DAS;
a plurality of second isolation circuits provided in a respective second internal power path among the plurality of second internal power paths, each second isolation circuit among the plurality of second isolation circuits configured to:
receive the second input power from the respective second input power port; and provide a second electrically isolated output power based on the received second input power at the second combined power node to provide the second combined output power;

a plurality of second control circuits provided between the second combined power node and the plurality of second isolation circuits in a respective second internal power path among the second plurality of second internal power paths to control the second electrically isolated output power provided to the second combined power node; and the controller configured to selectively control the plurality of second control circuits to control the second electrically isolated output power delivered from each second isolation circuit in the respective internal power path, to the second combined power node into the second combined output power.

\* \* \* \* \*